US010533924B2

(12) United States Patent
Pickford

(10) Patent No.: US 10,533,924 B2
(45) Date of Patent: Jan. 14, 2020

(54) PHASE CONTRAST MICROSCOPE TEST SLIDE FOR AIRBORNE ASBESTOS ANALYSIS

(71) Applicant: Pickford Resources Pty Ltd., Brisbane (AU)

(72) Inventor: Geoff Pickford, Brisbane (AU)

(73) Assignee: PICKFORD RESOURCES PTY LTD., Brisbane (AU)

(*) Notice: Subject to any disclaimer, the term of this patent is extended or adjusted under 35 U.S.C. 154(b) by 0 days.

(21) Appl. No.: 16/045,761

(22) Filed: Jul. 26, 2018

(65) Prior Publication Data

US 2019/0033166 A1   Jan. 31, 2019

(30) Foreign Application Priority Data

Jul. 26, 2017   (AU) .................... 2017902931

(51) Int. Cl.
*G01M 11/02*   (2006.01)
(52) U.S. Cl.
CPC .............. *G01M 11/0207* (2013.01)
(58) Field of Classification Search
CPC ... G01M 11/0207; G02B 21/34; G02B 21/14; G02B 27/62
USPC ........................... 356/243.1–243.8
See application file for complete search history.

(56) References Cited

U.S. PATENT DOCUMENTS

| 5,766,677 A | 6/1998 | Dimou et al. |
| 2007/0103804 A1 | 5/2007 | Pang |
| 2008/0138245 A1 | 6/2008 | Kim et al. |
| 2011/0177548 A1 | 7/2011 | Graham et al. |

FOREIGN PATENT DOCUMENTS

JP   2003-90963 A   3/2003

OTHER PUBLICATIONS

Search report under Section 17(5) received for GB Patent Application No. GB1812187.1, dated Jan. 22, 2019, 4 pages.

*Primary Examiner* — Tri T Ton
(74) *Attorney, Agent, or Firm* — EcoTech Law Group, P.C.

(57) ABSTRACT

A phase contrast detection limit test slide is described for testing a phase contrast microscope. The test slide comprises a series of devices each having a first end and an opposing second end and comprising a plurality of phase objects disposed substantially between the first and second ends. The phase objects are formed by formed by nanometre fabrication techniques. The plurality of phase objects of any one device have a single phase angle in the range of about 2° to about 8°, and the devices are arranged over the test slide so that the phase angle increases across the series of devices. Each plurality of phase objects is further arranged substantially in the centre of concentric guides provided on each device to guide the eye to the phase objects, and a cover slip disposed over the devices. Also described is a process for using the test slide.

15 Claims, 18 Drawing Sheets

EMBODIMENTS
LEGEND ——— 14
 Coverslip ——— 7
 High RI Coating ——— 15
 Low RI Coating ——— 16
Etch-Single Layer-Ver 1 ——— 22
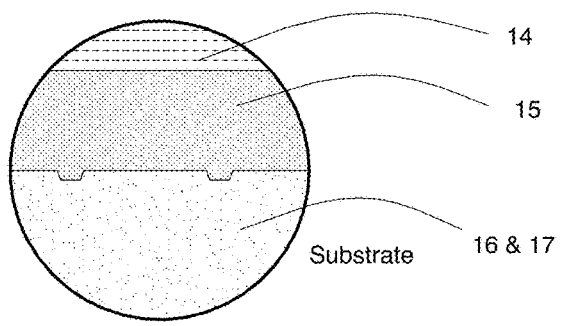
Deposit-Single Layer ——— 20
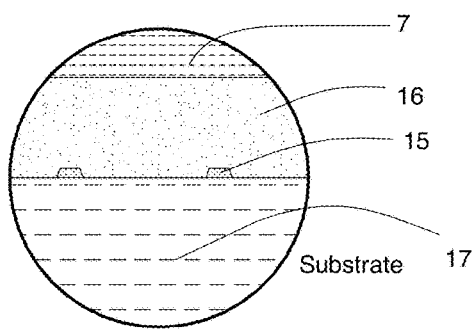
Etch-Single Layer-Ver 2 ——— 23
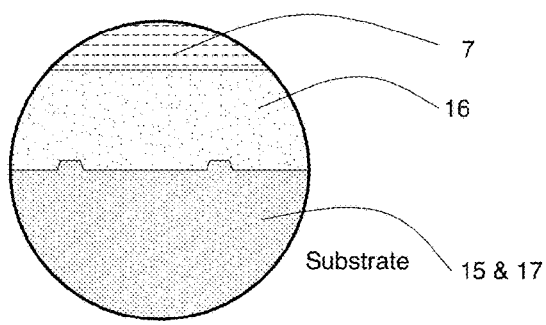
Deposit-Double Layer ——— 21
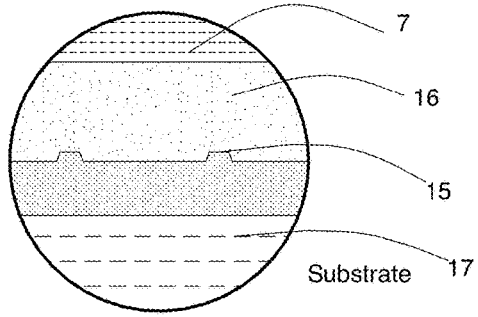
Etch-Double Layer ——— 24
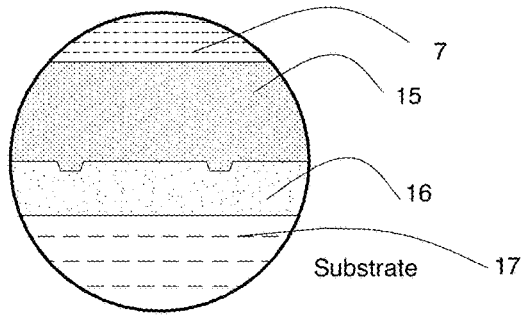
Fig. 6

PHASE CONTRAST MICROSCOPE TEST SLIDE FOR AIRBORNE ASBESTOS ANALYSIS

RELATED CASE

This application claims priority to Australian Patent Application No. 2017902931, which was filed on Jul. 26, 2017 and is incorporated herein by reference for all purposes.

TECHNICAL FIELD

The invention relates generally to microscope testing and specifically to a method of manufacturing, storing and using a device to test the effectiveness of a phase contrast microscope for its suitability in the process of estimating and or analysing airborne asbestos fibre concentrations.

BACKGROUND ART

It has been known for more than 100 years that various diseases are caused by breathing airborne asbestos fibres, which are now known to include pleural and pulmonary asbestosis, lung cancer, mesothelioma, and possibly some other cancers.

Crude methods of measurement of asbestos fibres commenced around 1900, with a number of different techniques being developed over the next 60 years.

The current method was developed during the 1960's, which samples a measured volume of contaminated air through a 0.8 pore size membrane filter. The filter is then mounted onto a microscope slide, and chemicals are applied so as to make the filter transparent.

After applying a coverslip, a Phase Contrast Optical Microscope (PCOM) is used to count all fibres which are defined geometrically as being greater than 5 µm long, less than 3 µm wide, and have a length:width ratio greater than 3:1.

Mineralogical studies had previously shown that asbestos fibres are crystals that had grown in such a way as to form long fibres, and when viewed under conventional (bright field) microscopy were invisible.

Thus, a means had to be found to convert the transparent fibres into 'amplitude' specimens—that is, able to be seen because there is a difference in light contrast between the fibres and that of the surrounding collection filter.

Asbestos fibres have a higher refractive index than the collection filter and are known as 'phase objects' because the light that passes through them travels at different speeds than through the filter—thus causing a phase shift in the light wavelength that is proportional to the 'optical path length' difference' (OPL Diff), which in turn is numerically equal to the diameter of the fibre multiplied by the difference in refractive indices. It is not uncommon to describe a phase object in terms of Phase Angle (in units of degrees) which is defined as the OPL Diff multiplied by 360 and divided by the wavelength of light, generally taken as 500 nm for phase contrast microscope applications; or in terms of Phase Angle (in units of mrad) which is defined as the OPL Diff multiplied by 1,000×2×π and divided by the wavelength of light, generally taken as 500 nm. The PCOM employs partial destructive interference of light, which converts fibre 'phase objects' into 'amplitude objects' because of its design.

PCOM is however a qualitative tool designed for originally observing biological matter, and if any of a number of parameters of the microscope design are changed, or if the configuration of a microscope is so adjusted or changed, this leads to changes in the microscope performance and hence to different levels of fibre detectability. For example, one microscope may be able to detect the presence of 0.05 µm diameter chrysotile asbestos fibres whereas another equally good quality microscope can only detect the presence of 0.2 µm diameter chrysotile fibres. Observer experience, conscientiousness, fatigue and eye acuity is also an important factor in the level of fibre detectability. It is only by testing the observer/microscope performance can these differences be eliminated and the concept of a 'standardised' microscope achieved.

Over the years, various failed attempts at producing a phase contrast detection limit test slide included the use of diatoms or microspheres, and the proposed used of insect web or quartz micro fibres.

In the late 1970's and early 1980's the United Kingdom (UK) Health and Safety Laboratory (HSL) of the UK Health and Safety Executive (HSE) and the UK National Physical Laboratory (NPL) collaborated and produced the first Phase-Contrast Test Slide (PCTS), known in this document as the 'HSE/NPL PCTS'.

The HSE/NPL PCTS is a conventional glass microscope slide which contains ridges of resin of various depths in seven sets, No. 1 to No. 7, which are covered with a second resin of slightly lower refractive index, which in turn is covered by a glass coverslip.

In use, observers must use the HSE/NPL PCTS on a daily basis, and must be able to detect all of the ridges in the first five sets, and optionally some of the ridges in the sixth set, but never the ridges in the seventh set.

The creation of the ridges was originally accomplished by the NPL by first using a 'ruling engine' (normally used for creating diffraction gratings) to rule grooves with a 'V' shaped diamond tool in an aluminium film which had been deposited on an optically flat glass substrate. The grooves were then replicated using resin, and placed onto glass microscope slide such that the grooves were uppermost thus creating ridges. A synthetic resin known as Euparal was then deposited on the replicate, over which a glass coverslip was placed.

The depth of each of the ridges is around ten times less than the width of the ridges, which in conjunction with the Euparal forms phase objects having an approximate OPD determined by the depth of the ridges and the difference in refractive indices between the ridge material and the Euparal. See Table 1.

TABLE 1

| Description | OPL Diff (nm) | Phase Angle (°) | Phase Angle (mrad) |
| --- | --- | --- | --- |
| HSE/NPL - No 1 | 108 | 7.4 | 129 |
| HSE/NPL - No 2 | 77 | 5.3 | 93 |
| HSE/NPL - No 3 | 64 | 4.4 | 77 |
| HSE/NPL - No 4 | 53 | 3.6 | 63 |
| HSE/NPL - No 5 | 44 | 3.0 | 52 |
| HSE/NPL - No 6 | 36 | 2.5 | 44 |
| HSE/NPL - No 7 | 25 | 1.7 | 30 |

The manufacture of the current UK HSE/NPL Phase Contrast Test Slide (PCTS) is very labour intensive, subject to errors in fabrication, variable in quality, has high rejection rates, and is expensive to produce.

From approximately mid 2016 to at least mid 2017, the mandatory UK Health and Safety Laboratory (HSL) inspection of every PCTS produced by a third party resulted in the rejection of a high percentage of devices because they did not perform satisfactorily.

The reasons for the inspection failures are not clear, even though it is believed to be due to manufacturing problems which have been difficult to overcome with any stability or certainty.

These failures have led to major problems for a number of laboratories throughout the world because the use of the HSE/NPL PCTS is mandated by various Country statutory and accreditation authorities, and also is required by the various analytical methods required to perform airborne asbestos fibre analyses. It is reported that some of the HSE PCTS have been stolen from various laboratories for use in other laboratories.

In essence, the current PCTS pushes the very limit of 1960's technology which would be impossible to maintain without considerable effort and expense.

The above mentioned old technology limited the presence of phase object locating 'guides' to rudimentary parallel and horizontal lines that are not very efficient effective in assisting the user in locating near invisible sets of phase objects. This deficiency is exacerbated by an extremely small microscope depth of field, and a stage which holds the test slide not being sufficiently stable to keep the phase object in focus when moving the slide from one set of phase object to another. Thus the phase objects often go out of focus thus becoming completely invisible.

The above mentioned old technology has prevented the use of sufficient space between, or identifying marks for any of the seven sets of phase objects, which leads to the user often having to backtrack over previously observed sets to make sure which particular set of phase objects are being observed. These deficiencies lead to frustration, loss of time, and sometimes incorrect results.

Accordingly there exists a need for an improved phase contrast detection limit test slide that seeks to overcome or at least ameliorate some of the problems of the prior art.

SUMMARY OF INVENTION

According to a first aspect of the invention there is provided a phase contrast detection limit test slide for testing a phase contrast microscope, the test slide comprising a series of devices each having a first end and an opposing second end and comprising a plurality of phase objects formed by nanometre fabrication techniques and disposed substantially between the first and second ends, wherein the plurality of phase objects of any one device have a single phase angle in the range of about 2° to about 8°, viz in the range of about 30 to about 130 mrad, and the devices are arranged over the test slide so that the phase angle increases across the series of devices, wherein each plurality of phase objects is further arranged substantially in the centre of concentric guides provided on each device to guide the eye to the phase objects, and a cover slip disposed over the devices.

In various embodiments, the invention resides in a test slide which may make use of one or more nanometre fabrication techniques so as to create a set of 'phase objects' to test the performance of the design and set-up of the PCOM and the performance of the observer in relation to airborne asbestos fibre measurements so that the microscope is 'fit for task' in relation to estimating airborne asbestos concentrations.

The nanometre fabrication techniques can include a variety of processes, techniques and measurements including but not limited to Electron Beam Lithography (EBL), Photo Lithography, Projection Lithography, Reactive Ion Etching (ME), Chemical Etching, Chemical Vapour Deposition (CVD), Plasma Enhanced Chemical Vapour Deposition (PECVD), Sputtering, Spinning, dicing, I-Line Stepper, Lift off, positive photo resist, negative photo resist, ellipsometer, profilometer, Atomic Force Microscope (AFM). It is notable that to the best of our knowledge, none of these processes was used in the development of any prior art, including the HSE/NPL PCTS.

The nanofabrication may assist to ensure that the PCOM:
1. has sufficient performance so as to exclude poorly designed or set-up microscopes as well as observers with eye problems, fatigue or with inexperience.
2. does not exhibit excessive performance in being able to observe finer fibres than microscopes in other laboratories throughout the world.

The test slide may enable that a fundamentally qualitative instrument becomes a quantitative instrument capable of observing very fine asbestos fibres at fibres at a certain historical level, but not to observe fibres that are finer than this.

The invention may, in embodiments, replace the existing HSE PCTS or may provide an alterative by using innovative and simple techniques that are conducted under ultra-clean room conditions to attempt to exclude contamination at all critical manufacturing stages and in some embodiments to exclude contamination of critical optical viewing layers.

Nanometre fabrication techniques may be used to create highly repeatable 'phase objects' in the range of 2 nm to 10 nm Optical Path Difference (OPD), or alternatively expressed in the range of 2° to 8° phase angle, which is equivalent to the range of 30 to 130 mrad phase angle, using highly stable materials in respect to dimensions and refractive index (RI) across the visible light spectrum. In some embodiments, the phase objects are created and then tested by an assembler to determine where the objects are in the range of 2 nm to 10 nm Optical Path Difference (OPD). Phase objects which meet the requirements for the test slide can be assembled in a series.

In some embodiments, once the test slide has been created, the repeatability in the dimensions of the phase objects extends to 100's or more devices thus reducing the time and cost of inspection and rejected devices For any embodiment designed to add to or replace the current HSE/NPL test slide, the phase objects should ideally provide similar or identical OPL Differences such that they present the same degree of detectability on a 'standardized PCOM no matter what test slide is used. The principal concept is that of 'detectability', which is determining if the image of an object is present or not. By this principal concept, nanofabrication techniques such as nanolithography do not necessarily improve detectability, but are thought to make a large contribution to being able to achieve a better controlled and more stable set of phase objects that are optionally prepared according to specifications, especially the components of said phase objects (viz etch depth and the refractive indices (RIs) of each material); or phase objects that are assembled by an assembler according to required specifications. The nanolithographical techniques described herein may provide the opportunity to accept or reject a 'device' at an early stage—once each of the set's OPL differences have been characterized as equivalent (or not) to each of the HSE/NPL's seven sets. It means that the devices can eventually be accepted or rejected by the routine RI and etch depth measurements that are built into each slide, and this can be achievable without mounting and comparing each competed test slide with the HSE/NPL sets.

The modular design of the devices may allow the adjustment of new batches such that the resulting PCTS can maintain the same standards from device to device and from batch to batch.

Comprehensive guides in the form of concentric markings and or distinguishing marks can be incorporated into the slide and may facilitate the user in locating the barely visible phase objects. These guides may assist the user to significantly reduce time in locating the phase objects and also to reduce frustration which is present with the existing test slide.

In various embodiments, the guides can be in the form of concentric guides. These guides can be in the form of circles, radial lines, squares, arrows and other geometrical shapes. In an embodiment, the concentric guides comprise a series of concentric rings with spacing in the range of from at least about 100, 200, 300, 400 or 500 µm. Each line forming the guide can have a thickness of at most about 1.0, 3.0, 5.0, 8.0 or 10 µm. There can be about 2, 3, 4, 5, or 6 rings in the concentric guide, but can be as many as 20 or more rings. Pairs of rings can be intersected with a straight line directing the eye towards the centre. Alternatively the concentric guides can comprise a series of arrows or other geometric shapes, or identifying letters, numbers or symbols. In an embodiment, the concentric guides are each adjacent to at least one distinguishing mark. The distinguishing mark may be unique to each device. The mark can have a size (e.g. longest dimension of height or width or length) in the range of from about at least about 0.5, 0.8, 1.1, 1.5 or 1.8 mm so that each device can be identified with the naked eye, by immediately recognising the distinguishing mark. For example, an identifying letter A can be 1.5 mm in height from the bottom to the top of the letter A. In order to further assist in the recognition of the device, a first distinguishing mark can be located towards the first end of a device and a second distinguishing mark can be located towards the second end of the device. The first and second distinguishing marks can be substantially identical.

In an embodiment there are a plurality devices selected from 3, 4, 5, 6, 7, or 8 in a series of devices and the single phase angle of the phase objects of the devices is selected from respectively 1.7, 2.5, 3.0, 3.6, 4.4, 5.3, 6.2 and 7.4 degrees, which were chosen to be similar to the HSE/NMP Slide. In some embodiments, the test slide may comprise less than 7 devices, because some of the original HSE 7 sets are no longer useful. The main feature now is to have one set clearly visible, the next set just visible, the next set only partly visible at best, and the final set not visible (viz a total of 4 sets). It may be that the first clearly visible set are not necessary (viz—only 3 sets may be required in total).

In some embodiments, the distinguishing mark is added before, during or following the nanofabrication of the phase objects in order to indicate to the user the phase angle of the phase objects on that device. In an embodiment, therefore, a first device has phase objects with a phase angle of 1.7 and a distinguishing mark in the form of the letter A; a second device has phase objects with a phase angle of 2.5 and a distinguishing mark in the form of the letter B; a third device has phase objects with a phase angle of 3.0 and a distinguishing mark in the form of the letter C; a fourth device has phase objects with a phase angle of 3.6 and a distinguishing mark in the form of the letter D; a fifth device has phase objects with a phase angle of 4.4 and a distinguishing mark in the form of the letter E; a sixth device has phase objects with a phase angle of 5.3 and a distinguishing mark in the form of the letter F; and wherein the seventh device has phase objects with a phase angle of 7.4 and a distinguishing mark in the form of the letter G.

In an embodiment, there are five devices and the single phase angle of the phase objects of the five devices can be chosen from the range of phase angles including but not limited to 1.7, 2.5, 3.0, 3.6, 4.4 degrees. The first set of phase objects has a phase angle in the above named series is associated with a distinguishing mark in the form of the letter A, whereas the fifth set of phase objects can have phase angles in the above named set with a distinguishing mark E. The letters increase in the series to indicate that the phase angle is increasing in the series. In an embodiment, there are six devices and the single phase angle of the phase objects of the six devices can be chosen from the range of phase angles including but not limited to 1.7, 2.5, 3.0, 3.6, 4.4 and 5.3 degrees. The first set of phase objects has a phase angle in the above named series is associated with a distinguishing mark in the form of the letter A, whereas the sixth set of phase objects can have phase angles in the above named set with a distinguishing mark F. The letters increase in the series to indicate that the phase angle is increasing in the series. In an embodiment, there are seven devices and the single phase angle of the phase objects of the seven devices can be chosen from the range of phase angles including but not limited to 1.7, 2.5, 3.0, 3.6, 4.4, 5.3 and 6.2 degrees. The first set of phase objects has a phase angle in the above named series is associated with a distinguishing mark in the form of the letter A, whereas the seven set of phase objects can have phase angles in the above named set with a distinguishing mark G. The letters increase in the series to indicate that the phase angle is increasing in the series. In an embodiment, there are eight devices and the single phase angle of the phase objects of the eight devices can be chosen from the range of phase angles including but not limited to 1.7, 2.5, 3.0, 3.6, 4.4, 5.3, 6.2 and 7.4 degrees. The first set of phase objects has a phase angle in the above named series is associated with a distinguishing mark in the form of the letter A, whereas the eight set of phase objects can have phase angles in the above named set with a distinguishing mark H. The letters increase in the series to indicate that the phase angle is increasing in the series.

In an embodiment, any of the devices can be associated with distinguishing marks in the form of the said letters as described above, or as numbers such as 1, 2, 3, and so on; or I, II, II and so on, or as symbols of any kind that will indicated the implied phase angle of a particular set of phase objects.

The above phase angle figures will be retained and repeated in the specification for convenience, however, it should be understood that there can be variations in the phase angles. A departure of several tenths of a degree in the phase angle of the phase objects would be of little consequence to the detectability of the phase objects. In some instances, following nanofabrication, the phase objects may not lend themselves to being arranged in series A, B, C, etc, since the errors inherent in the nanofabrication technique might make phase objects marked as e.g. B too close in angle to those marked as e.g. A. In any assembly of devices A, B, C, D, E, F, G, H the devices might not be compatible with one another in terms of the required differences in phase angle between them. In which case, it is preferable to make a series of phase objects or a "pool" of phase objects from a quartz wafer and label them as to the location on the wafer using a spread-sheet cell identifying convention where A, B, C, etc denote columns running from left to right, and 1, 2, 3 etc denote rows going from top to bottom. Individual locations can then be identified by combining the column and row identification—for example, B03 would be the device located in the second row and third column of the wafer. The device identifications can then be used during characterisation of each set of phase objects on a device and be used to categorise each device relative to the phase angle for later classification into A, B, C etc for proper assembly into the slide.

Once an A device has been selected for use by the assembler, the appropriate B device can then be selected. Once the B device has been selected, an appropriate C device can be selected, and so on. The difference between each of the phase angles of each device can be at least about 0.5, 0.6, 0.7, 0.8 or 0.9 degrees. A final series of devices may be chosen from a number of different quartz wafers, and comprise, for example, Wafer 10, device A01, Wafer 11, device B03, Wafer 14, device C03, Wafer 17, device D08, Wafer 20, device A01, Wafer 10, device F04. The wafer numbers and location letters and numbers chosen are exemplary only and serve only to show how such a test slide might be assembled from a pool of devices comprising phase objects. In this embodiment, since the final series may comprise devices from different sources (different quartz wafers) each device is naturally separate from another device (it is a separate piece), but can be grouped in the series of the devices side by side by the test slide support structure described herein.

In an embodiment, the distinguishing letters, numbers or symbols can be in the form of opaque deposits such that the large distinguishing letters, numbers or symbols are clearly visible to the naked eye.

At least one distinguishing mark may be replicated whole or in part in smaller size in the respective concentric guides to which it is adjacent. This means that when the devices are being assembled, a user is also able to reference which device is currently being viewed. The smaller replicated distinguishing marks can have lines with widths of at most about 30, 50, 80 or 100 μm In an embodiment, the location marks in the form of concentric guide that may be in the form of lines, circles, squares and other geometric shape, and the small distinguishing letters, numbers or symbols associated with them can be in the form of opaque deposits that are clearly visible through the microscope. The said opaque deposits can be any material that provides such a characteristic and may include any metal or mineral.

In an embodiment, the phase objects are formed by variations in topography at the interface between a first material and a second material, the first and second materials having different refractive indices. The average RI difference as taken over the visible light spectrum from 400 to 800 nm wavelength, between the first and second materials having different refractive indices may range from 0.8% up to 4.6% for different materials being used. The average RI difference as taken over the visible light spectrum from 400 to 800 nm wavelength, between the first and second materials having different refractive indices may be at least about 0.5, 1, 1.5, 2, 2.5, 3, 3.5, 4, 4.5 or 5% for different materials being used. In one embodiment the average RI difference between the first and second materials having different refractive indices is in the range of from about 0.02 to about 0.03.

The various materials that may be used include titanium nitride, silicon dioxide, palladium, magnesium aluminium oxide, aluminium oxide, aluminium oxynitride, indium tin oxide, zinc oxide, silicon nitride, lithium niobate, zinc sulphide, titanium oxide, zinc selenide, silicon carbide, gallium nitride, soda lime glass, crown glass, dense flint glass, chromium, aluminium, PMMA, Euparal, Eukitt, Canada balsam.

In an embodiment, the thicknesses of the said various materials can range from several nanometres to tens or hundreds of micrometres, and depends upon an interacting range of other parameters involved in the nanotechnology techniques chosen.

In an embodiment, the first material is quartz and the second material is PMMA. In an embodiment, the first material is magnesium aluminium oxide and the second material is aluminium oxide. In an embodiment, the first material is zinc sulphide and the second material is gallium nitride. In an embodiment, the first material is magnesium aluminium oxide and the second material is aluminium oxide. In an embodiment, the first material is synthetic resin Euparal and the second material is quartz.

In an embodiment, the phase objects can comprise etched lines with a depth in the range of from about 20, 40 or 60 to about 360 nm, preferably 80 nm to about 140 nm. The etched lines may have a width in the range of from about 0.5 to 1.5 μm.

In an embodiment, the phase objects are formed by nanolithographic techniques, including various etching, spinning, coating techniques which were developed as a result of extensive testing, and which required significant modifications and fine tuning of multiple and different processing steps to provide stable, accurate, precise and uniform devices. The modifications and fine tuning of the multiple and different processing steps comprise a unique manufacturing regime which cannot be reproduced without the steps described herein. The nanolithographic techniques can ensure reproducibility in the phase objects since the fabrication technique can make accurate, sharp features of high resolution.

In one embodiment, the test slide comprises a top slide portion and a bottom slide portion. The top and bottom portion can be any shape, but they are each desirably the shape of a common test slide. The top and bottom portions can be intended to be overlaid on one another to form the test slide. The top and bottom portions can be substantially the same size. Alternatively, the top and bottom portions can be different sizes. The top portion can define a cut-out and the bottom portion can define a smaller cut-out. The cut-out can be formed during manufacture of the slide portion. The cut-outs can be arranged in each portion so that when the top and bottom portions are overlaid on one another light can pass through the cut-out part of the slide. Since the cut-out in the top portion is larger than the cut-out in the bottom portion, once the two portions are overlaid on one another, a recess is defined by the wall of the cut-out of the top portion. The recess is sized so that the series of devices are able to fit snugly into it so as to be supported by their respective first and second ends by the exposed part of the bottom portion. The devices are each supported so that in use light passes through the part of the devices comprising the plurality of phase objects. A location marker can be provided on the test slide to guide a user as to where the device associated with e.g. the letter A should be located, and so on. The location marker can be engraved on the test slide and can comprise the same letter, e.g. A, B, C, D, E, F, G, H.

The devices can each in the range of from about 2 to about 6 mm wide, about 6 to about 10 mm in length and about 0.5 to about 1.0 mm in thickness. The top and bottom portions of the slide can be adhered together by a high quality double sided permanent adhesive tape, and the devices are also adhered into the said recesses, A high quality glass coverslip, which may be borosilicate glass, or another type of glass can be adhered onto the top of the devices and that part of the upper surface of the top portion of the slide that is covered by the coverslip. The coverslip provides protection for the devices and also corrects spherical aberration caused by the 40 magnification microscope objective that requires said coverslip because of its design.

In an embodiment, the top surfaces of the devices are all level with each other as a result of the said recess formed in the top portion so enabling all phase objects to be substantially level with each other thus facilitating the observation of each set of guides which themselves assist in the location of the almost invisible phase objects. The size and opaqueness of the guides is also such that it facilitates the observer in locating the guides through the microscope after being reassured by the existence of large distinguishing marks on each end of the device that are visible to the naked eye.

The HSE/NPL test slide and by inference, this invention, is required to be used daily by microscopists for the estimation of airborne asbestos fibres. Some microscopists cannot observe the required number of phase object sets and are not permitted to continue until they can. The cause of this deficiency may be a problem with eyesight, a mental state, an incorrect microscope set-up, dirty optics, or a defective test slide—all of which must be corrected. For some microscopes not tested before with a test slide, a microscopist might be able to observe too many phase object sets, which shows that this microscope is not suitable in its present form for the estimation of airborne asbestos fibres, and must not be used in that said form.

Storage, and transportation if relevant, of any piece of valued and fragile piece of laboratory equipment is important to safeguard said equipment, and this applies to the test slide. In one embodiment, a box can be provided to hold the test slide, The 'slide box' can be manufactured from any stable plastic material, acrylic, timber, steel or aluminium, and may be designed so that the test slide can be identified easily, is held securely, does not rattle, and is easy to remove and replace.

According to another aspect of the invention there is a process for testing a phase contrast optical microscope, the process comprising using a test slide according to the description herein. According to another aspect of the invention there is provided a process for manufacturing a test slide comprising a plurality of phase objects, the process comprising forming a plurality of phase objects by nanometre fabrication techniques including nanolithography. The resultant test slide comprising a series of devices each having a first end and an opposing second end and comprising a plurality of the phase objects disposed substantially between the first and second ends, wherein the plurality of phase objects of any one device have a single phase angle in the range of about 2° to about 8°, and wherein the process includes the step of arranging the devices over the test slide so that the phase angle increases across the series of devices. Each plurality of phase objects can be arranged so as to be substantially in the centre of concentric guides provided on each device to guide the user eye to the phase objects. The process can also include the step of placing a cover slip over the devices.

The step of arranging the devices can comprise characterising the phase objects by measurements of etch depth, refractive index and phase contrast visibility. In order to do this, a wafer (e.g. a four inch wafer that has been processed in accordance with one or more embodiments described herein) is selected for testing. A number of devices comprising various phase objects are selected for analysis/characterisation. The devices for characterisation can be selected by one or more of: at random; in accordance with surface analysis data (optionally data from Dektak (a process by which repeatable, accurate measurements on varied surfaces can be obtained) or Atomic Force Measurements, which provide etch depth measurements conducted on the wafer); and in accordance with refractive index tests conducted on the wafer (e.g. the PMMA and quartz layers). One the devices for characterisation have been selected, one device at a time can be taken and mounted on slide. The phase objects can then be viewed using phase contrast optical microscope (PCOM) using 40× objective and 10× to 16× eyepiece. The assembler would compare qualitatively how each of the phase objects fabricated into the device compare with Sets 1 to 7 of the HSE test slide. Software can then be used (e.g. USA software ImageJ or open source software MicroManager) to quantitatively measure grey levels of the etched phase object grooves in comparison to the background. The grey level differences, or percentage differences, with similar measurements conducted previously on at least 2 to 4 different 'approved' HSE test slides are compared. Using this comparison data, the device is categorised as being one of an A, B, C, etc, device, or as a reject. Rejected devices are no longer used. Similar devices in A, B, C, etc, categories are then pooled for later insertion into the stainless steel test slide for future PCOM testing and/or sale.

BRIEF DESCRIPTION OF DRAWINGS

Embodiments of the invention will now be described with reference to the accompanying drawings which are not drawn to scale and which are exemplary only and in which:

FIG. 6 shows various embodiments used to create the phase objects.

DESCRIPTION OF EMBODIMENTS

The test slide of the present invention can comprise a plurality of devices (e.g. 3 to 8) each device having a different phase object having a phase angle. In some embodiments, the phase objects are formed using nanolithography and are pre-characterised by measurements of etch depth, refractive index and phase contrast visibility— and can be marked for example as A, B, C, etc, depending upon the degree of phase contrast visibility. In some embodiments, a series or "pool" of phase objects intended for use as an A, B, C, etc, are prepared by nanolithography and are marked A01, A02, A03, etc, for each quartz wafer produced. After characterisation by measurements of etch depth, refractive index and phase contrast visibility, the most appropriate of these is then selected for assembly of the device for use as an A, B, C etc.

Figure 1:
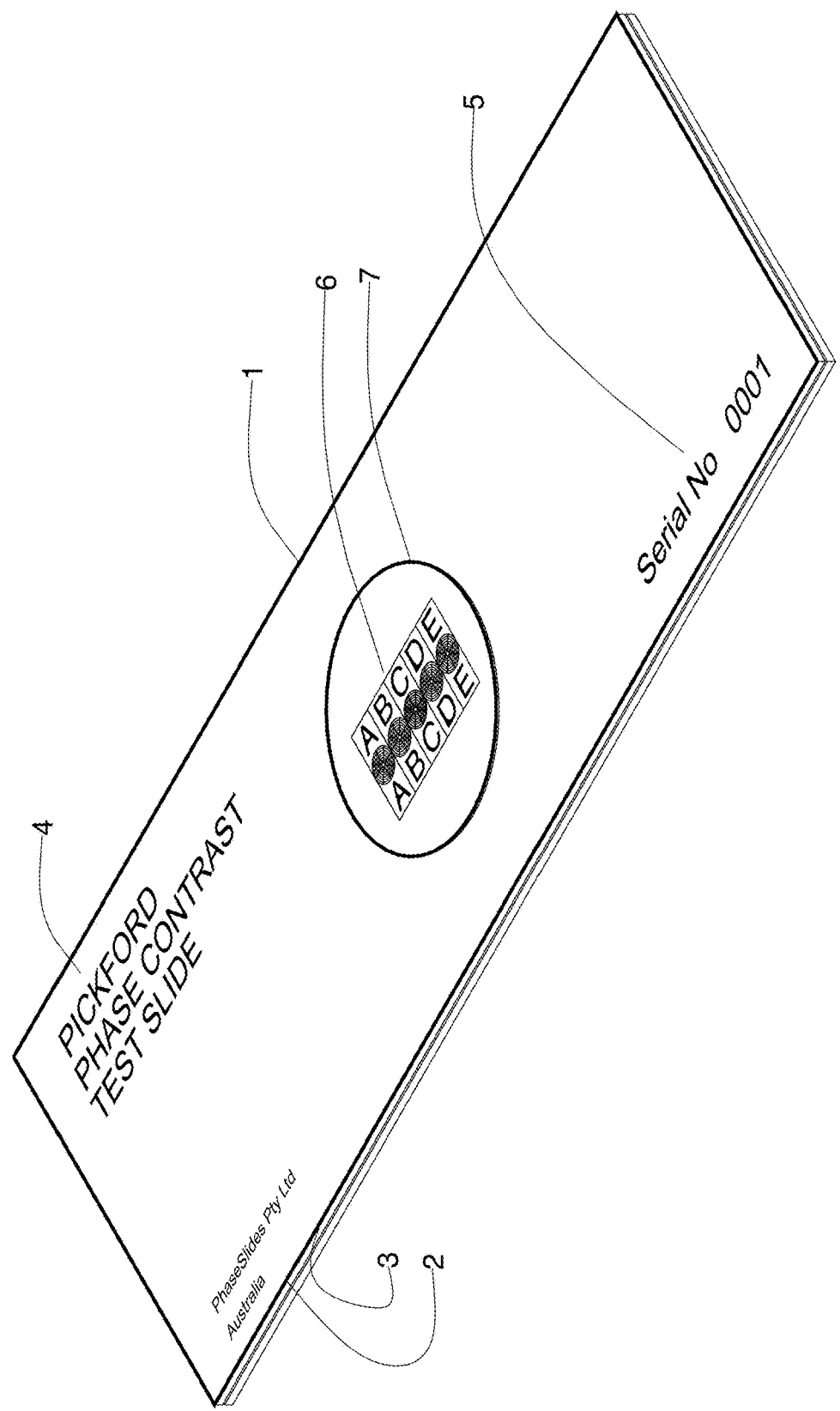
FIG. 1 shows a general view of the test slide identifying the main components, slide, phase contrast devices ('devices'), identification engraving and coverslip.
Figure 2:
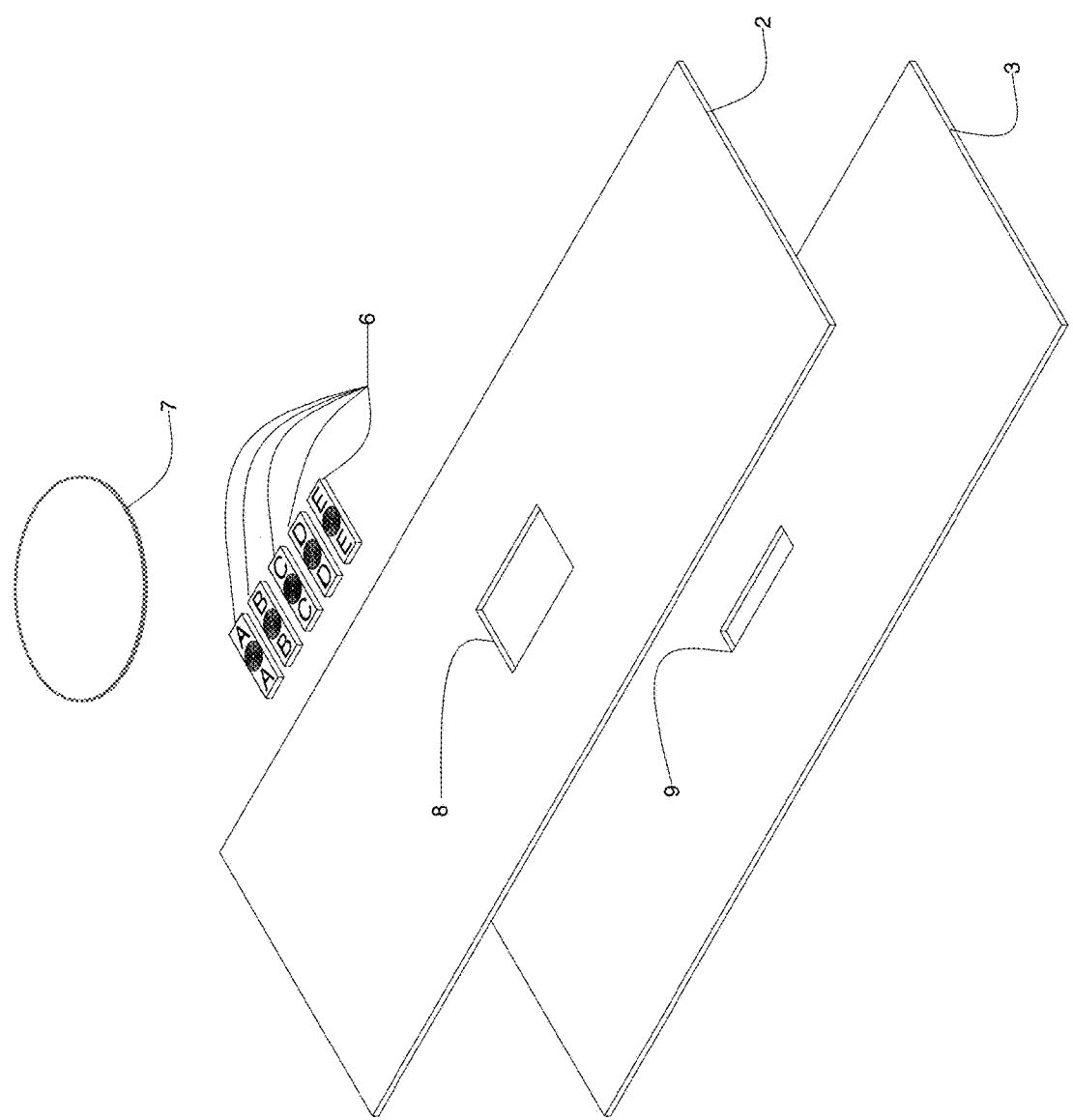
FIG. 2 shows an exploded perspective view of the slide, showing the same components as for FIG. 1 but also showing that the slide comprises a top and bottom portion, where the top portion houses the devices, and the bottom portion provides a shelf on which the devices can rest, and a hole to allow light to pass through the arrangement.

FIGS. 1 and 2 shows an embodiment of the test slide which uses a metal, two-piece slide 1 of dimension 75 mm long, 25 mm wide and 1 mm thick, which comprises a top portion 2 and a bottom portion 3. The top portion 2 contains a rectangular hole 8 in which the devices are housed. The bottom portion 3 contains a rectangular hole 9 which allows light to pass through the central part of the devices 6. Both portions 2, 3 are adhered together and the devices 6, may be between three and eight in number, are adhered in cut-outs 8 and 9. A coverslip 7 is adhered on top of the devices 6, and provides protection to the devices 6 and may assist to correct spherical aberration for the PCOM. The slide contains engraved identification 4 and serial number 5.

As can be seen in the exploded view of FIG. 2 (in which there are five devices, but there could be more or less), each device 6 is shown as a separate piece since each is formed separately using nanofabrication techniques. The phase objects are formed on the device piece and then brought together in the phase object set. The devices are shown as rectangular, but it should be understood they can be of any shape. In comparison, the HSE slide phase object sets of the prior art are all part of one slide, and are not separate. This is because the phase object set of the HSE slide are typically formed by a ruling engine on aluminium coating (the master) and replicated from the master onto resin which is placed onto a normal microscope slide. It is possible that the nanofabrication technique described herein could be used to prepare the phase object set of the present invention on one slide (rather than on separate device), but this would require a complex masking technique that may be feasible, but is not currently commercially desirable.

Figure 3:
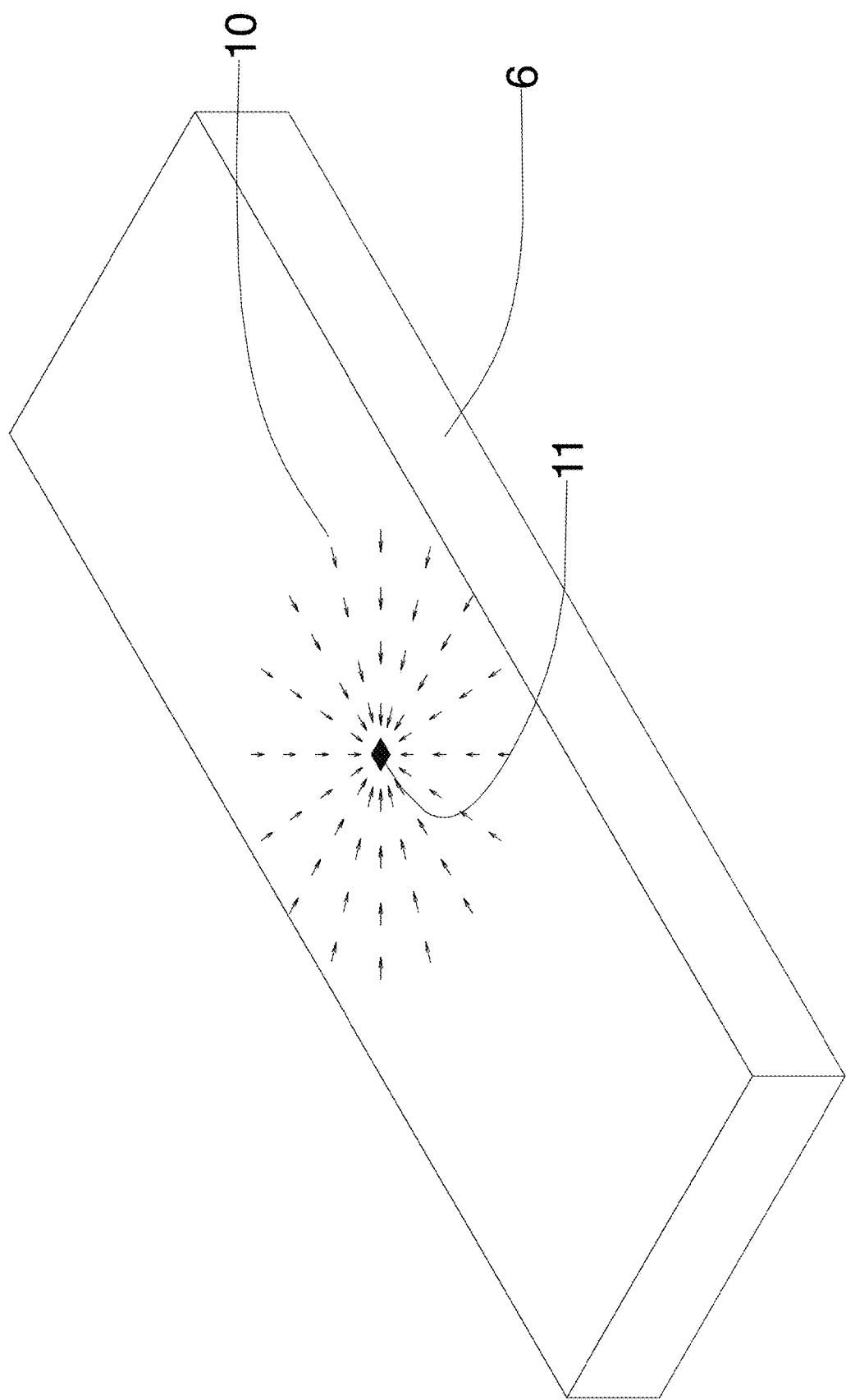
FIG. 3 shows various locating marks on the device which may be used to guide microscopists to the central 'phase objects' area.

One embodiment of each device 6 of FIG. 3 contains a series of imprinted arrows designed to assist the microscopist to locate the phase objects 11.

Figure 4:
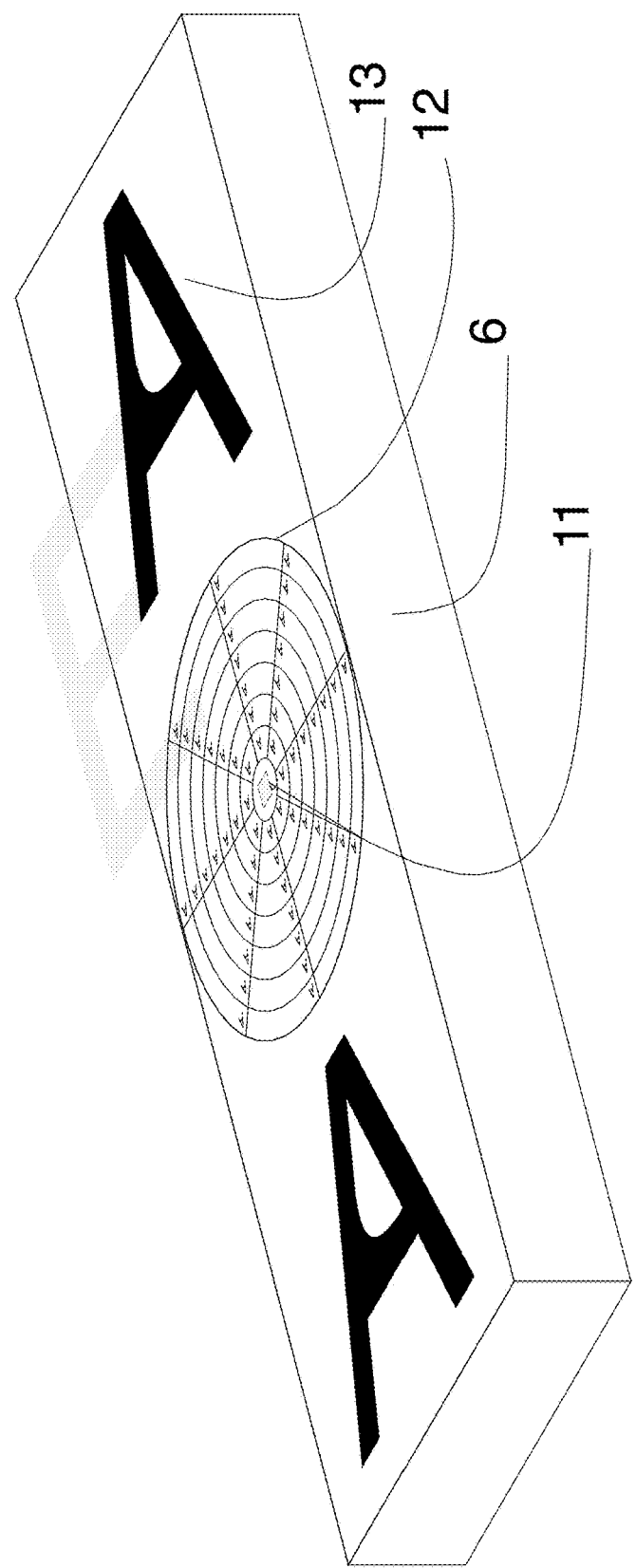
FIG. 4 shows another embodiment with large letters on the device which may be used to identify to the naked eye which device is being viewed, and smaller letters laterally and vertically reversed, which may be used to guide the user in identifying which device is being viewed through the microscope.

Another embodiment of each device 6 of FIG. 4 contains a series of concentric circles and radial lines designed to assist the microscopist to locate the phase objects 11. Small letters adjacent to each of the circles and radial lines are designed to assist the microscopist to identity which particular set of phase objects 11 are being observed when viewing through the microscope. Large letters 13 are present to assist in the assembly of the devices 6 on the slide 1, and also to assist the microscopist identify which set of phase objects 11 are being observed using the naked eye.

Figure 5:
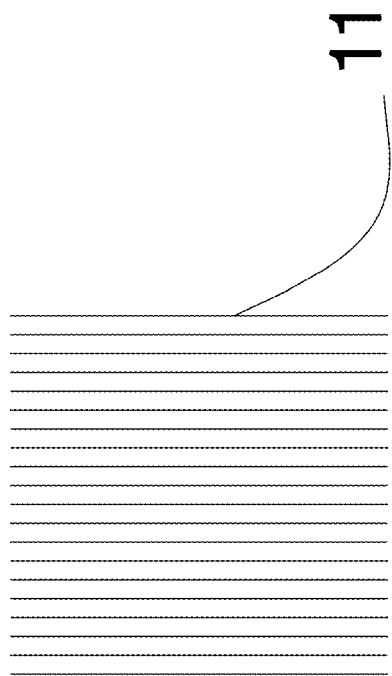
FIG. 5 shows the phase objects which in this embodiment comprise 20 lines, each 100 μm long, and with a pitch of 5 μm.

FIG. 5 shows the phase objects 11, which comprise 20 lines each 100 μm long and spaced 5 μm apart. These phase objects 11 in various embodiments consist of either grooves or ridges. Embodiments are depicted in FIG. 6, although the embodiments possible are not limited to the number shown. The Figure shows that the lines of phase objects 11 are formed at the interface between two coatings once with a higher refractive index than the other. The lines can be seen as grooves or ridges.

The legend 14 distinguishes between the coverslip 7, a high refractive index (RI) coating 15 and a low refractive index coating 16, where the terms high and low are simply meant to be relative in terms of each other, even though the actual RI difference between them is only quite small. One embodiment 20 is known as 'Deposit-Single Layer' because a high RI ridge 15 is formed on the surface of substrate 17, and the said ridge 15 is coated and surrounded with a low RI coating 16 which is turn is covered by a coverslip 7.

Another embodiment 21 is known as 'Deposit-Double Layer' because a high RI coating 15 is deposited on the substrate 17, and is etched to produce ridges which are coated and surrounded with a low RI coating 16 which is turn is covered by a coverslip 7.

Another embodiment 22 known as 'Etch-Single Layer-Ver 1' because a low RI substrate 16 (which is also the substrate 17) is etched to produce grooves which are then coated and surrounded by a high RI coating 15 which is turn is covered by a coverslip 7.

Another embodiment 23 known as 'Etch-Single Layer'-Ver 2 because a high RI substrate 15 (which is also the substrate 17) is etched to produce ridges which are coated and surrounded with a low RI coating 16 which is turn is covered by a coverslip 7.

Another embodiment 24 known as 'Etch-Double Layer' because a low RI coating 16 is deposited on the substrate 17, and is etched to produce grooves which with a high RI coating 15 which is turn is covered by a coverslip 7.

Note that any of the embodiments may use a variety of materials and coatings including but not limited to titanium nitride, silicon dioxide, palladium, magnesium aluminium oxide, aluminium oxide, aluminium oxynitride, indium tin oxide, zinc oxide, silicon nitride, lithium niobate, zinc sulphide, titanium oxide, zinc selenide, silicon carbide, gallium nitride, soda lime glass, crown glass, dense flint glass, chromium, aluminium, PMMA, Euparal, Eukitt, Canada balsam.

In order to form and then analyse the layers any of the embodiments may use a variety of processes, techniques and measurements during manufacture and subsequent analysis including but not limited to Electron Beam Lithography (EBL), Photo Lithography, Projection Lithography, Reactive Ion Etching (ME), Chemical Etching, Chemical Vapour Deposition (CVD), Plasma Enhanced Chemical Vapour Deposition (PECVD), Sputtering, Spinning, dicing, I-Line Stepper, Lift off, positive photo resist, negative photo resist, ellipsometer, profilometer, Atomic Force Microscope (AFM), Transmission Electron Microscope (TEM), Scanning Electron Microscope (SEM).

Figure 7:
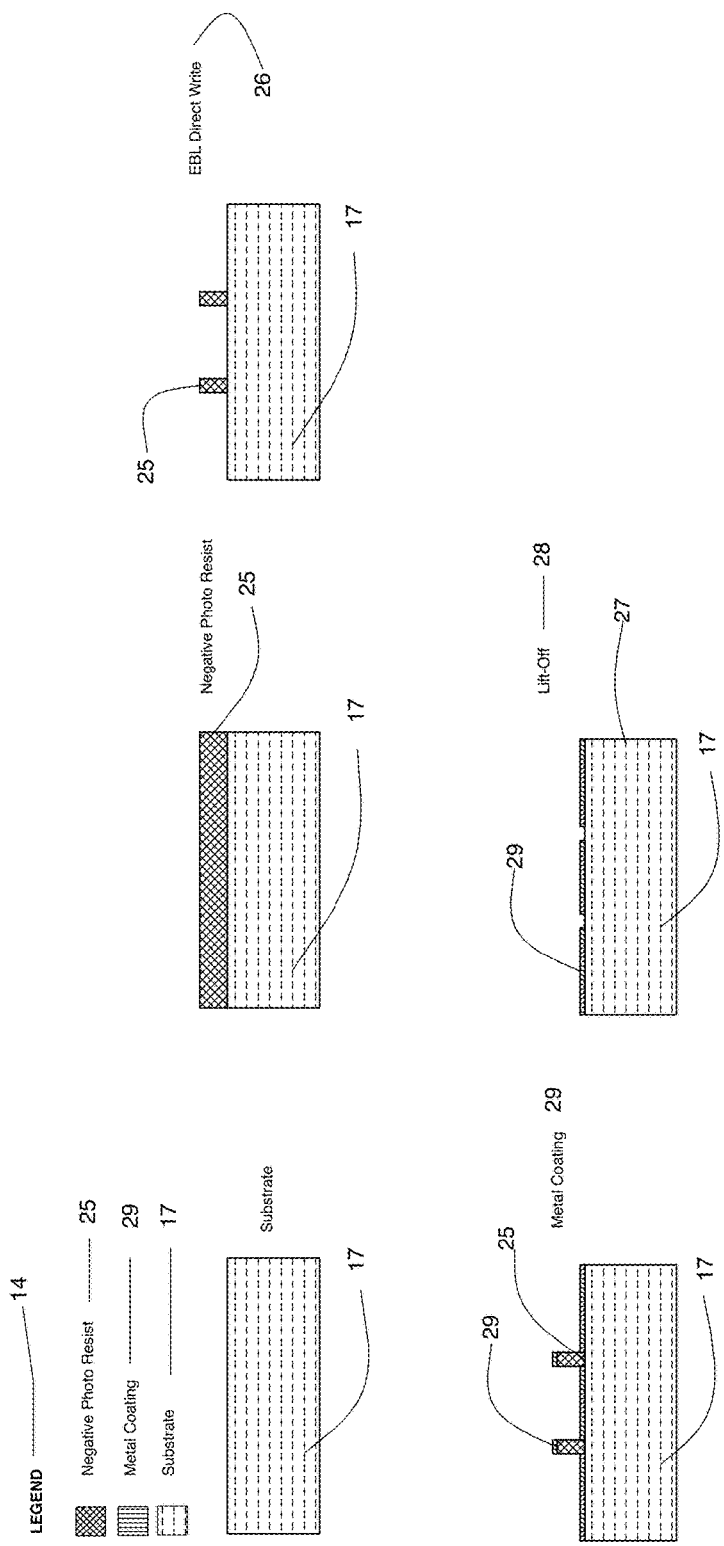
FIG. 7 shows one embodiment of creating a photo-mask.

FIG. 7 shows one embodiment of the process of fabricating a photo mask 27 which commences with a substrate 17, upon which a negative photo resist coating 25 is applied. One embodiment uses an Electron Beam Lithography (EBL) process 26 employing 'direct writing' to remove required portions of the photo resist leaving behind ridges 25. The EBL exposure is followed by a wash off to leave behind ridges 25 on top of the substrate 17. A metal coating 29 is deposited on top of the said ridges 25 and exposed substrate 17, and then a 'lift-off' process 28 completes the fabrication of a photo mask 27.

Figure 8:
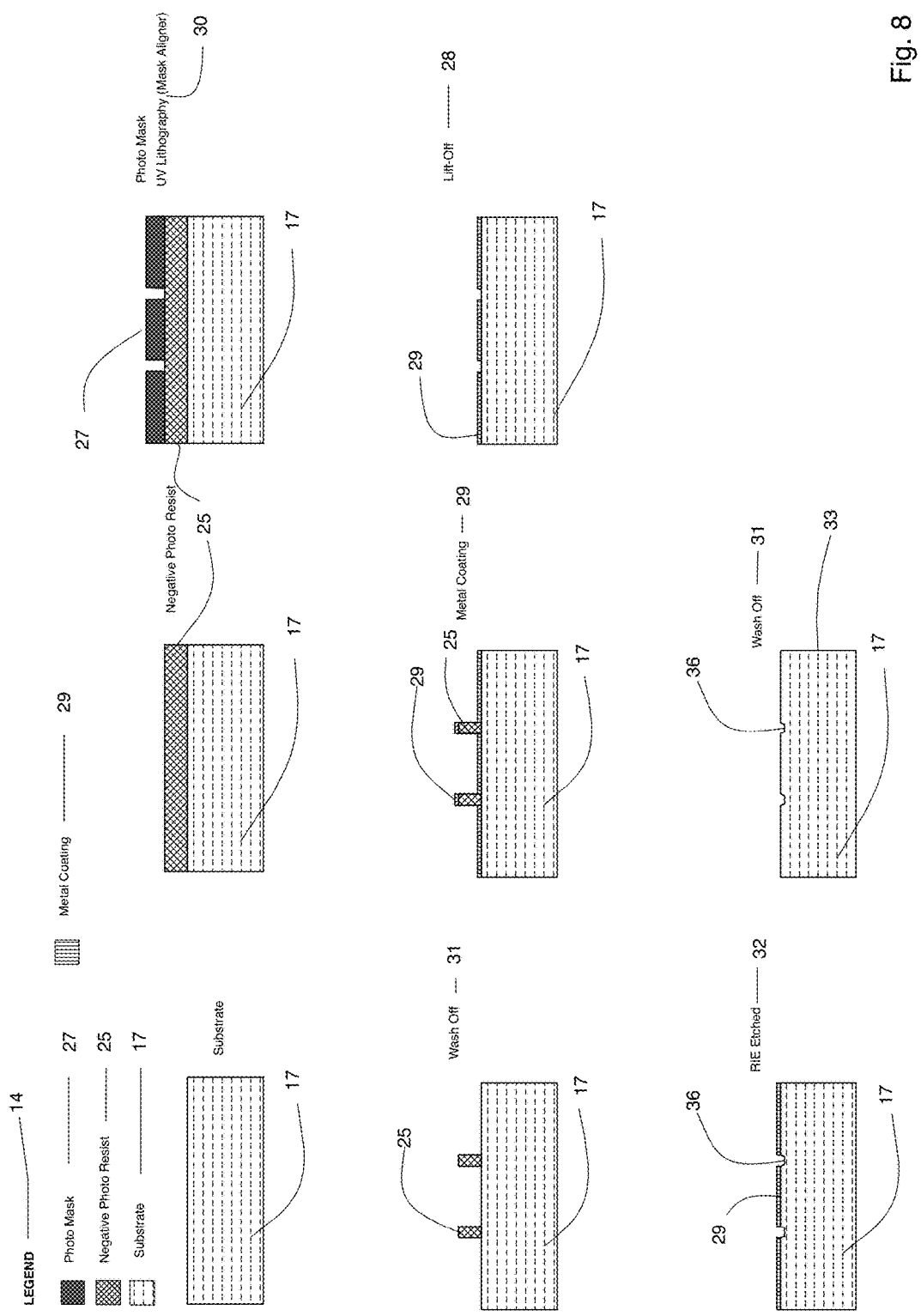
FIG. 8 shows one embodiment of creating the phase objects using a photo-mask.

FIG. 8 shows one embodiment of the process of fabricating an 'Etch-Single Layer-Ver 1' 22 phase objects on device 6 which commences with a substrate 17, upon which a negative photo resist coating 25 is applied. A photo mask 27 is used to expose the photo resist coating 25 in one embodiment to UV light using Ultra Violet Lithography (UVL) 30. The non UV exposed negative photo resist 25 is washed off 31. The surface is then coated with metal 29, and then a 'lift-off' process 28 removes the remaining negative photo resist 25. The metal coated 29 substrate 17 is then etched 36 in one embodiment by a Reactive Ion Etcher (ME) 32, after which the negative photo resist is removed by wash-off 31, the remaining etched substrate 17 being the phase objects 11.

Figure 9:
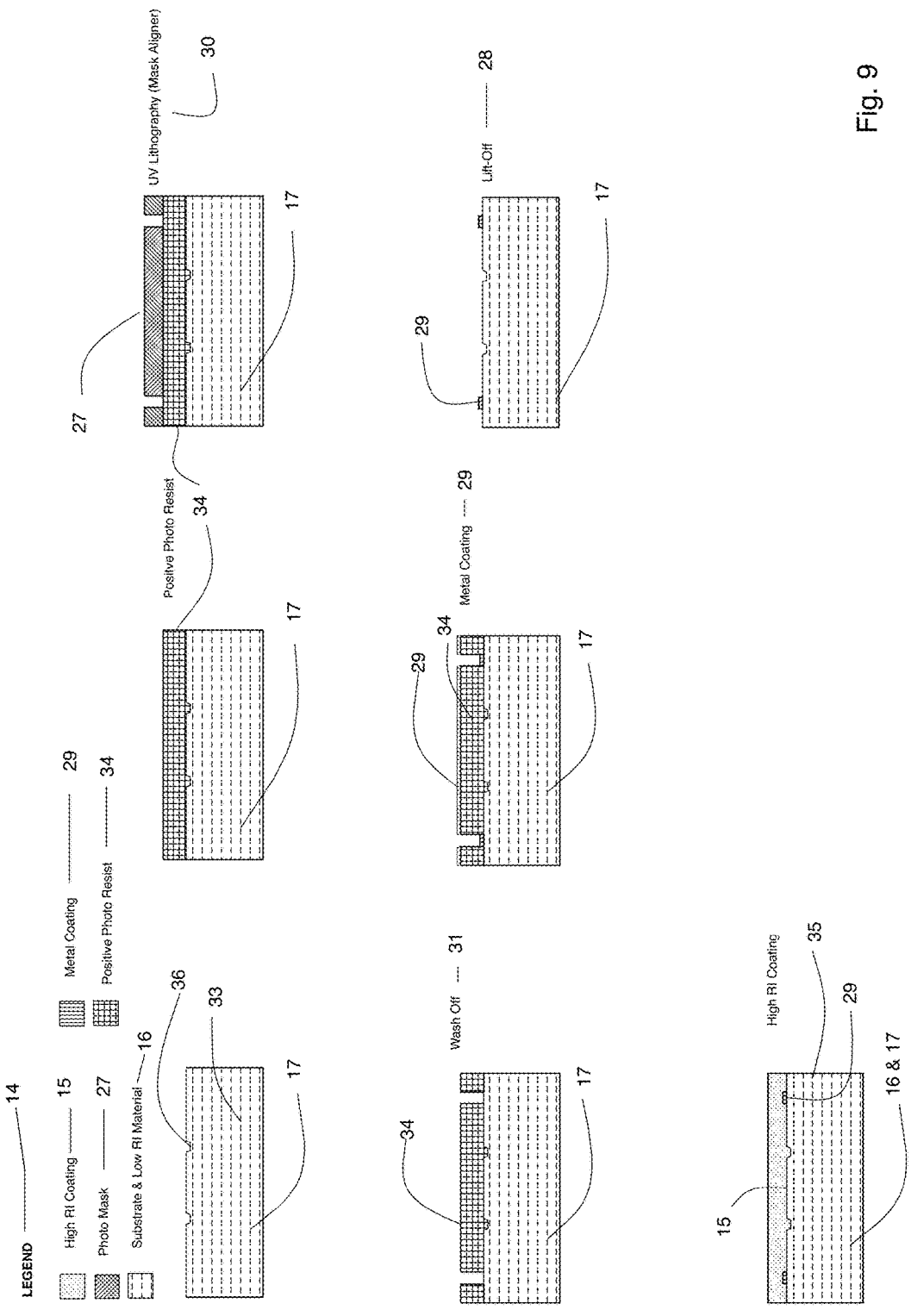
FIG. 9 shows one embodiment of creating guide lines and identifying features to guide users of the invention.

FIG. 9 shows one embodiment of the process of fabricating the guides 10, 12 and 13 on to an 'Etch-Single Layer-Ver 1' 22 which commences with a substrate 17, already with etched phase objects 11, upon which a positive photo resist coating 34 is applied. A photo mask 27 having the pattern of the guides is used together with Ultra Violet Lithography (UVL) 30 as one embodiment to expose the positive photo resist coating 34. The exposed positive photo resist 34 is washed off 31, then coated with metal 29, and then a lift-off process 28 to remove the remaining positive photo resist 34. The metal coated 29 and etched 36 substrate 17 is then coated with a high refractive index coating 15, thus resulting in a device 6 including the phase objects 11 and the guides 10, 12 and 13. The guides are formed from the metal coating 29.

One embodiment 22 which uses the 'Etch-Single Layer-Ver 1' process includes the use of a quartz substrate 17 as a low refractive index material 16 and a Poly Methyl Methacrylate (PMMA) high refractive index coating 15. Measurements on actual materials of the RI difference between 400 and 800 nm wavelength of light shows a variation of ±0.8% up to a maximum of ±4.6%, depending upon the grade of PMMA being used. This low percentage variation means that if any microscopists do not comply with the standard requirement of using green light and instead use blue of un-filtered light, this should not cause any noticeable shift in the performance of the phase objects in terms of detectability.

The other significant factor in detectability of the phase objects includes the depth of the etched grooves and their shape. Every batch of devices fabricated are tested for groove depth, and owing to the techniques employed show insignificant variations.

Figure 10:
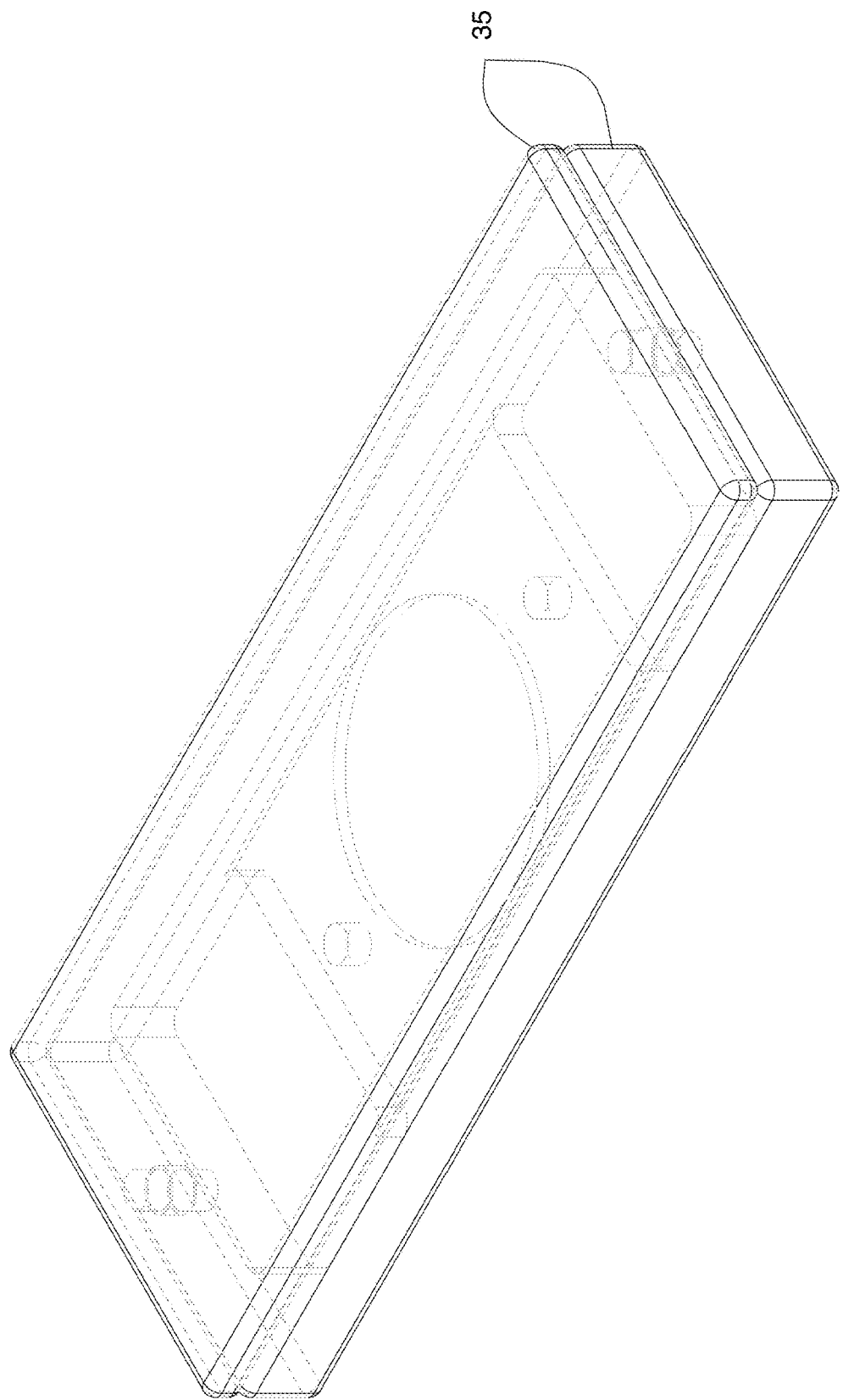
FIG. 10 shows one embodiment of the slide box to hold the slide during transportation and whilst not in use.

Because the devices are used in laboratories where environmental temperatures and variations of environmental temperatures are moderate to ensure the relative comfort of staff, these factors are unlikely to have any significant effect on detectability of the proposed test slides. FIG. 10 shows an assembled view of an embodiment of the slide box 35 in which the test slide 1 is held during transportation and when not in use.

Figure 11:
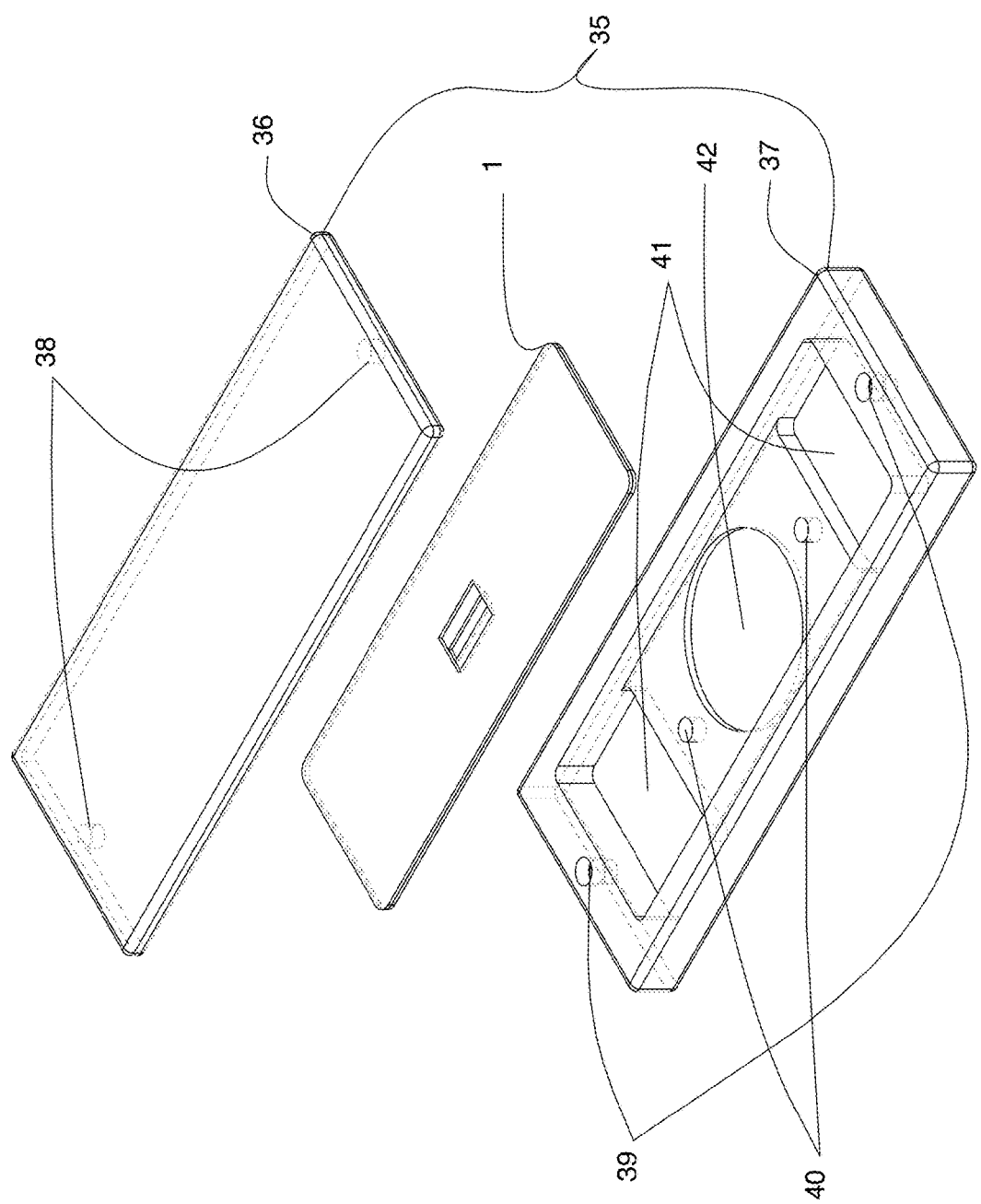
FIG. 11 shows one embodiment of said slide box in its exploded perspective view, showing the top and bottom portions of the slide box.

FIG. 11 shows an exploded perspective view of said slide box 35 comprising a top portion 36 and a bottom portion 37, in which slide 1 is held during transportation and when not in use. Two blind holes 38 in the top portion 37 hold magnets which is an embodiment are rare earth cylindrical magnets, but may be in other embodiments other forms and shapes of magnets. Two blind holes 39 in the bottom portion 37 hold magnets which is an embodiment are rare earth cylindrical magnets, but may be in other embodiments other forms and shapes of magnets. When the top portion 36 is placed near to the bottom portion 37, the magnets attract each other being of opposite magnetic poles, thus drawing the top portion 36 towards the bottom portion 37, thus effecting closing of each said portions. The magnetic attraction of both sets of magnets is such that it requires a significant and appropriate force to separate the top portion from the and bottom portion, thus keeping the contents safe from damage.

In one embodiment, two blind holes 40 in the bottom portion exert a magnetic force on the bottom of the test slide, thus keeping if from falling out if the bottom portion is accidentally inverted. In one embodiment, a single circular depression 42 is provided to allow the test slide to be inverted, and said depression allows the coverslip 7 to be accommodated thus preventing it from damage. In one embodiment, two rectangular depressions 41 allow the user to press on each end of the said test slide so that the opposite end to that being pushed rises sufficiently so that the user can easily hold and remove said test slide with ease.

Figure 12:
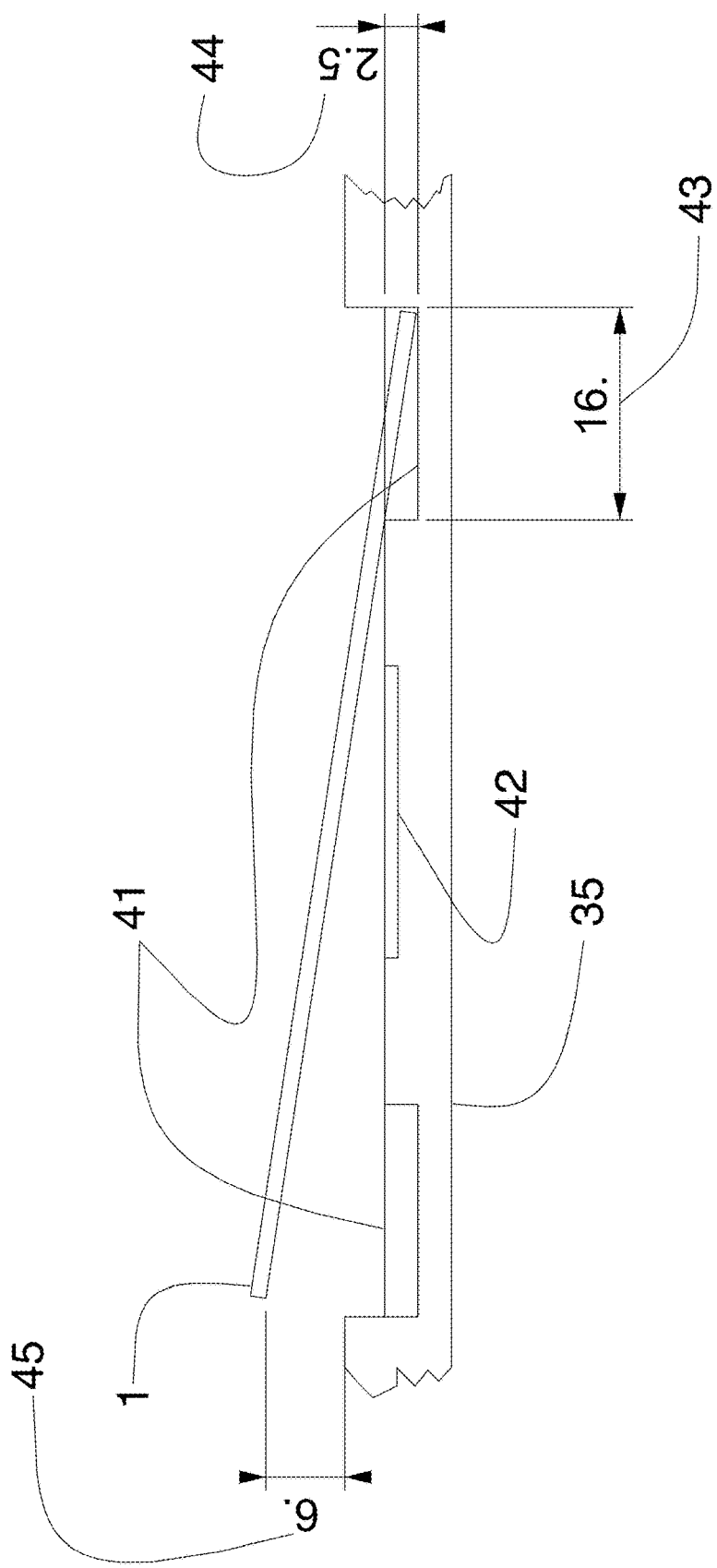
FIG. 12 is a side cross sectional view, showing a slide being removed from the slide box of FIG. 11.

FIG. 12 shows the mechanism of this removal process, where the test slide 1 is pushed down at the right hand end into depression 43 which in an embodiment is 16 mm long 43 and 2.5 mm deep 44, the left hand end of test slide 1 raises itself by around 6 mm 45, thus easily enabling the user to hold the left hand end and then lift the said test slide out of bottom portion 37 of slide box 35. The same action can be executed by pushing down on the left hand end into depression 43 which in an embodiment is 16 mm long 43 and 2.5 mm deep 44, the right hand end of test slide 1 raises itself by around 6 mm 45, thus easily enabling the user to hold the left hand end and then lift the said test slide out of bottom portion 37 of slide box 35, In one embodiment, the top portion of the slide box 36 is transparent, thus enabling any viewer to observe the presence or absence of the test slide therein, and be able to read and identify the type of test slide and the serial number of said test slide. This feature facilitates choosing the correct test slide for use, and in preparation of any transportation or movement of the test slide.

Figure 13:
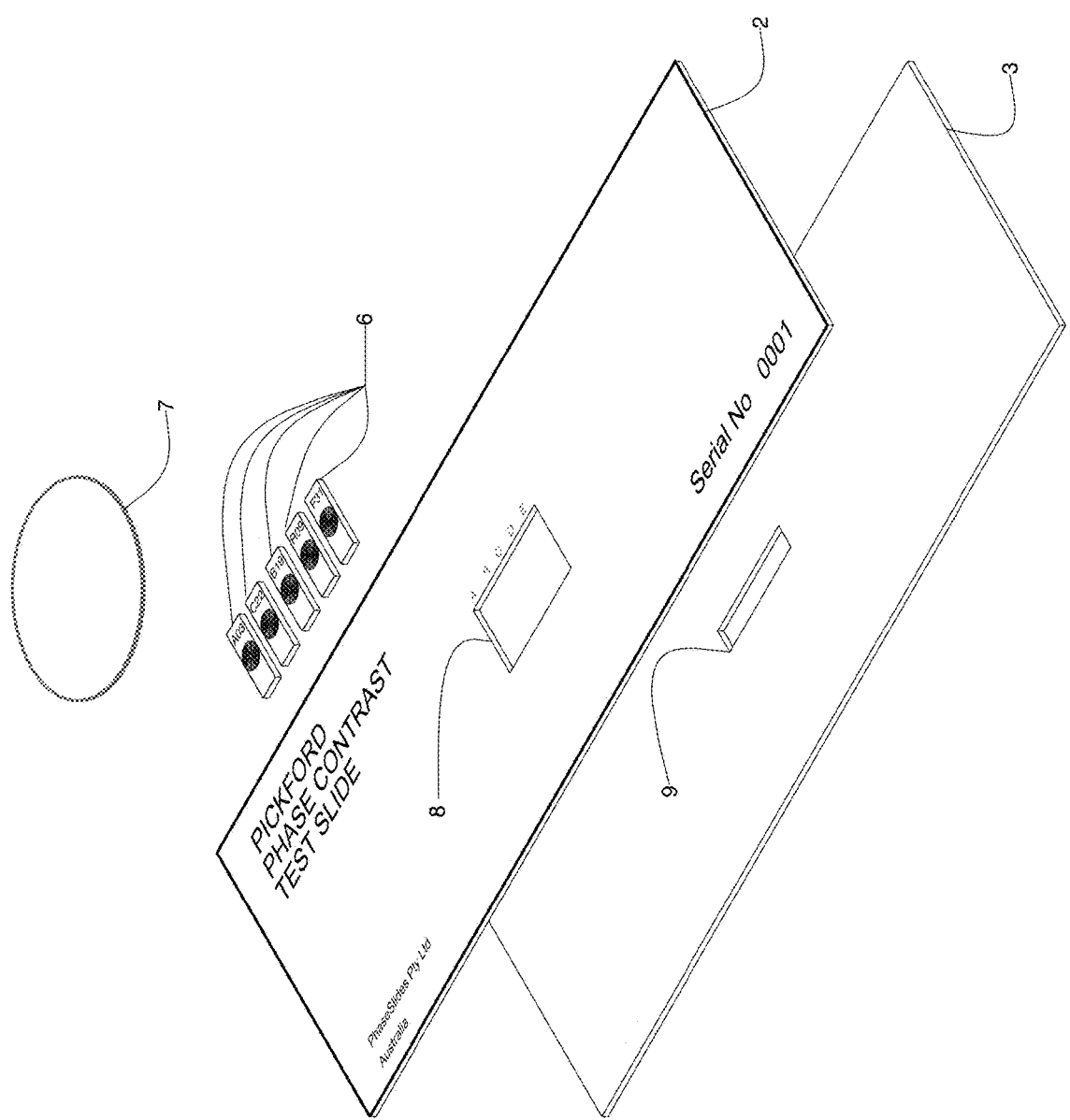
FIG. 13 shows a general view of the test slide identifying the main components, slide, phase contrast devices ('devices'), identification engraving and coverslip. Identification letters (location markers) have been added to the slide to enable a user to locate a specific device more easily.
Figure 14:
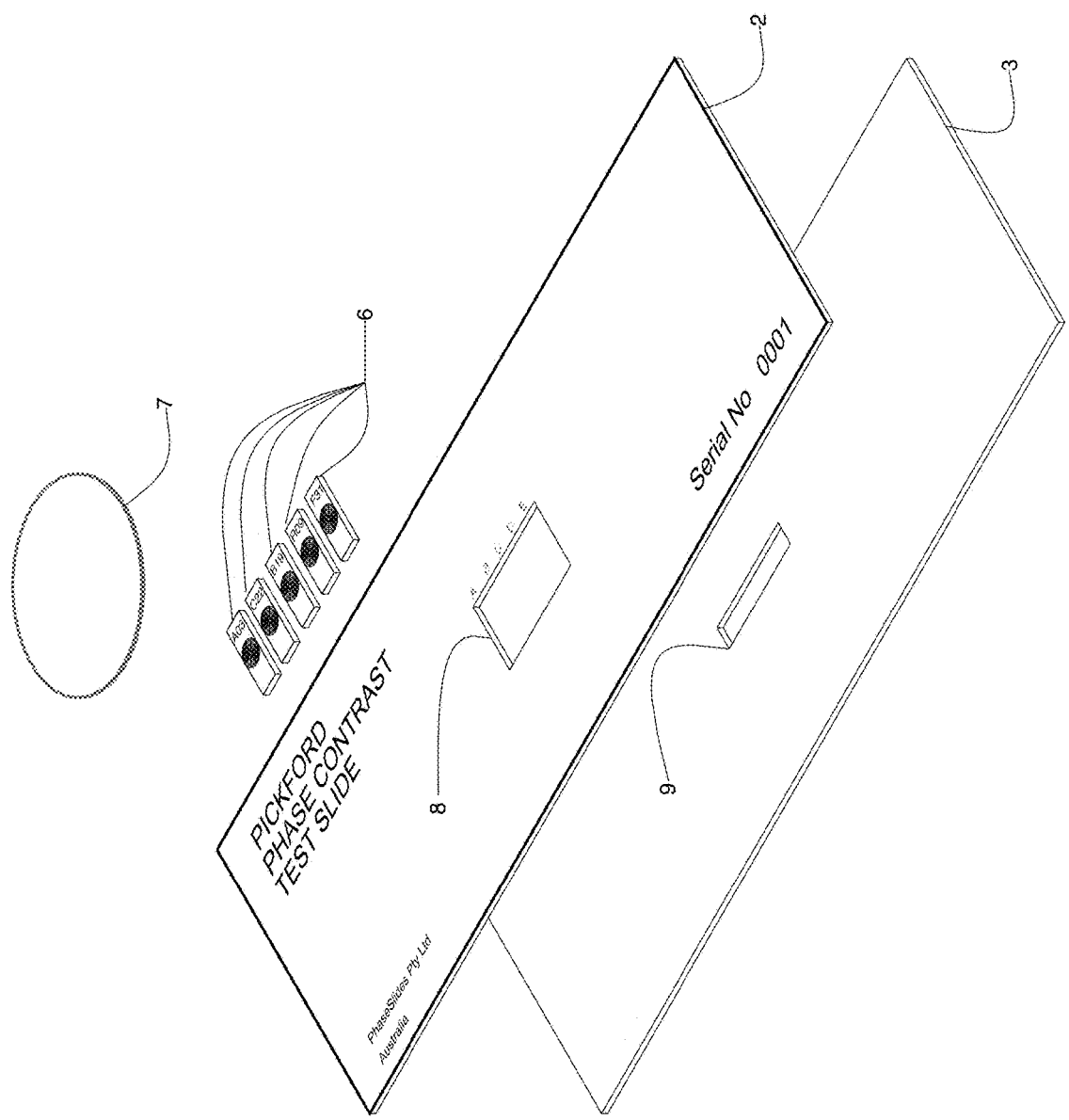
FIG. 14 shows an exploded perspective view of the slide, showing the same components as for FIG. 13 but also showing that the slide comprises a top and bottom portion, where the top portion houses the devices, and the bottom portion provides a shelf on which the devices can rest, and a hole to allow light to pass through the arrangement.

FIGS. 13 and 14 show an embodiment of the test slide which uses a metal, two-piece slide 1 of dimension 75 mm long, 25 mm wide and 1 mm thick, which comprises a top portion 2 and a bottom portion 3. The top portion 2 contains a rectangular hole 8 in which the devices are housed, and with engraved or deposited identifying letters, A, B, C, D etc to assist the user in locating the correct set of phase objects. The bottom portion 3 contains a rectangular hole 9 which allows light to pass through the central part of the devices 6. Both portions 2, 3 are adhered together and the devices 6, (may be between three and eight in number), are adhered in cut-outs 8 and 9. A coverslip 7 is adhered on top of the devices 6, and provides protection to the devices 6 and may assist to correct spherical aberration for the PCOM. The slide contains engraved identification 4 and serial number 5.

Figure 15:
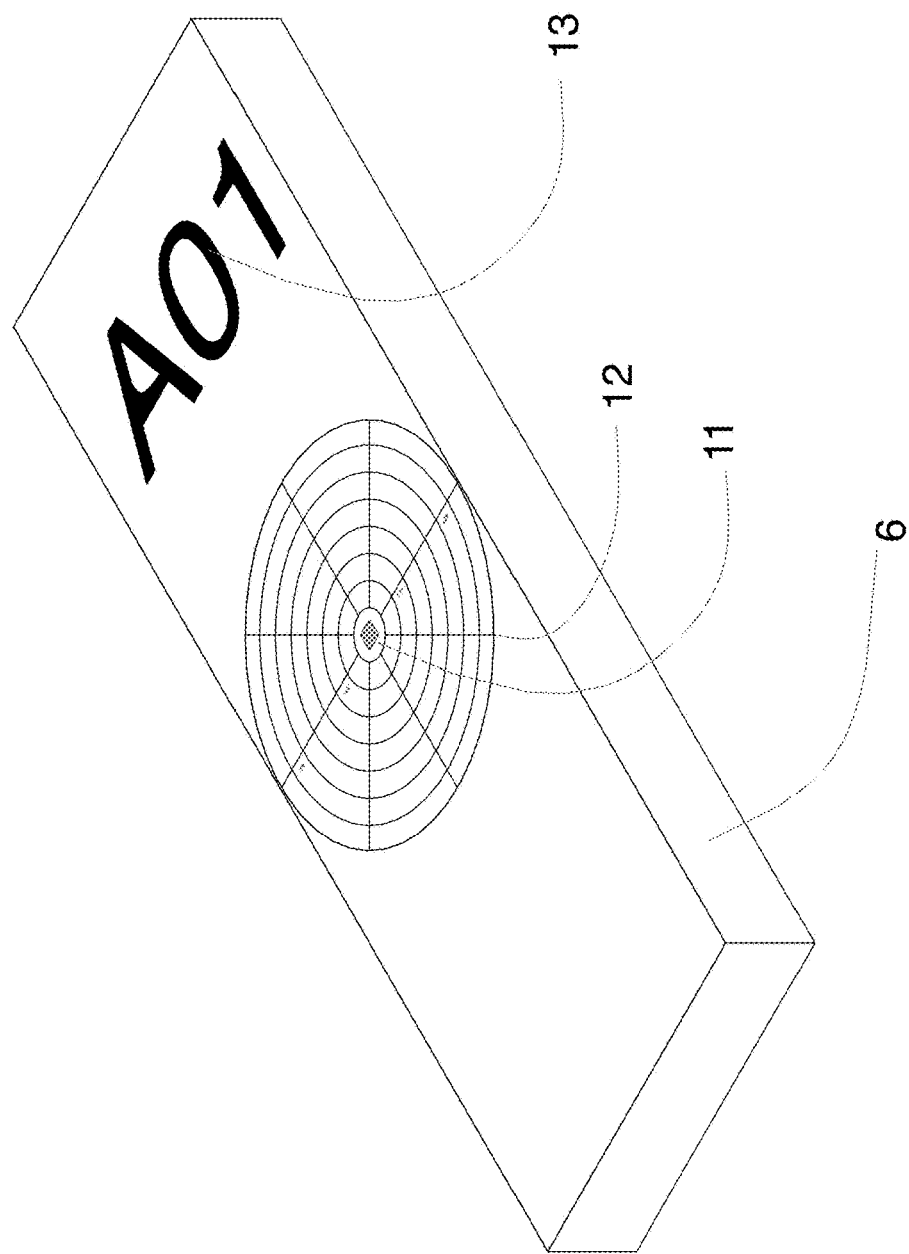
FIG. 15 shows another embodiment with large letters and numbers on the device which may be used to identify to the naked eye which device is being viewed, and smaller letters laterally and vertically reversed, which may be used to guide the assembler in identifying which device is being viewed through the microscope.

Another embodiment of each device 6 of FIG. 15 contains a series of concentric circles and radial lines designed to assist the microscopist to locate the phase objects 11. Small letters adjacent to each of the circles and radial lines are designed to assist the assembler to identity which particular set of phase objects 11 are being observed when viewing through the microscope. Large letters 13 are present to assist in the assembly of the devices 6 on the slide 1, when using the naked eye.

Figure 16:
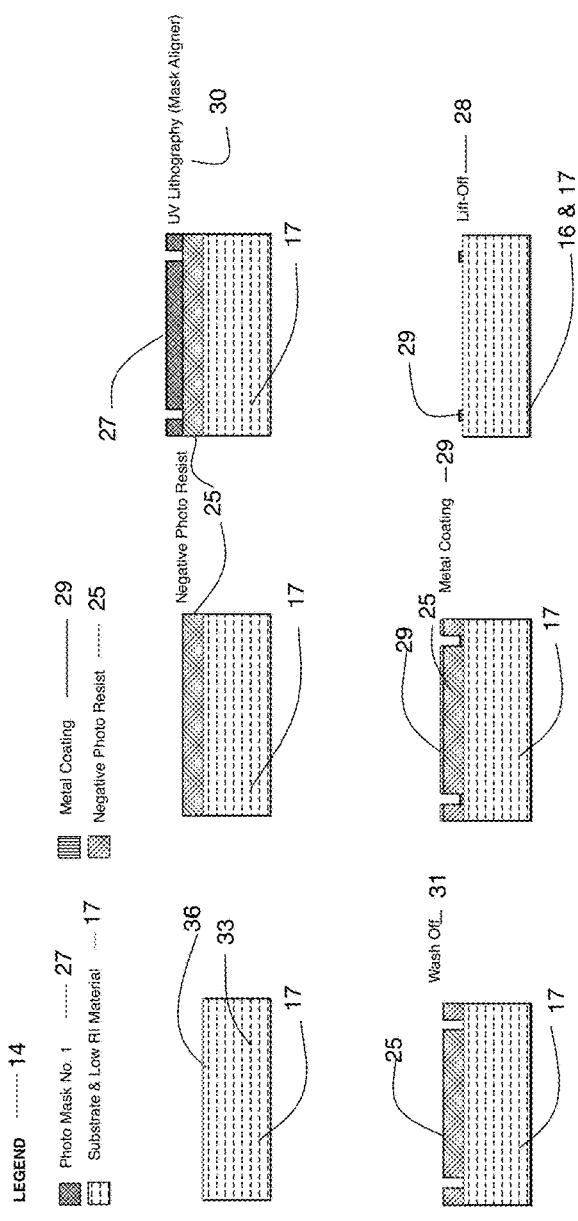
FIG. 16 shows one embodiment of using one photo-mask to create alignment guides lines to assist in production.

FIG. 16 is an embodiment of the FIG. 8 'Etch-Single Layer-Ver 1' 22 process, and has three steps. Step 1 creates alignment guides lines to assist in production. A negative photoresist 25 is applied to the quartz substrate 17, second a photo-mask 27 is used to expose the negative photo resist coating 25 in one embodiment to UV light using Ultra Violet Lithography (UVL) 30. The non UV exposed negative photo resist 25 is washed off 31. The surface is then coated with metal 29, and then a 'lift-off' process 28 removes the remaining negative photo resist 25.

Figure 17:
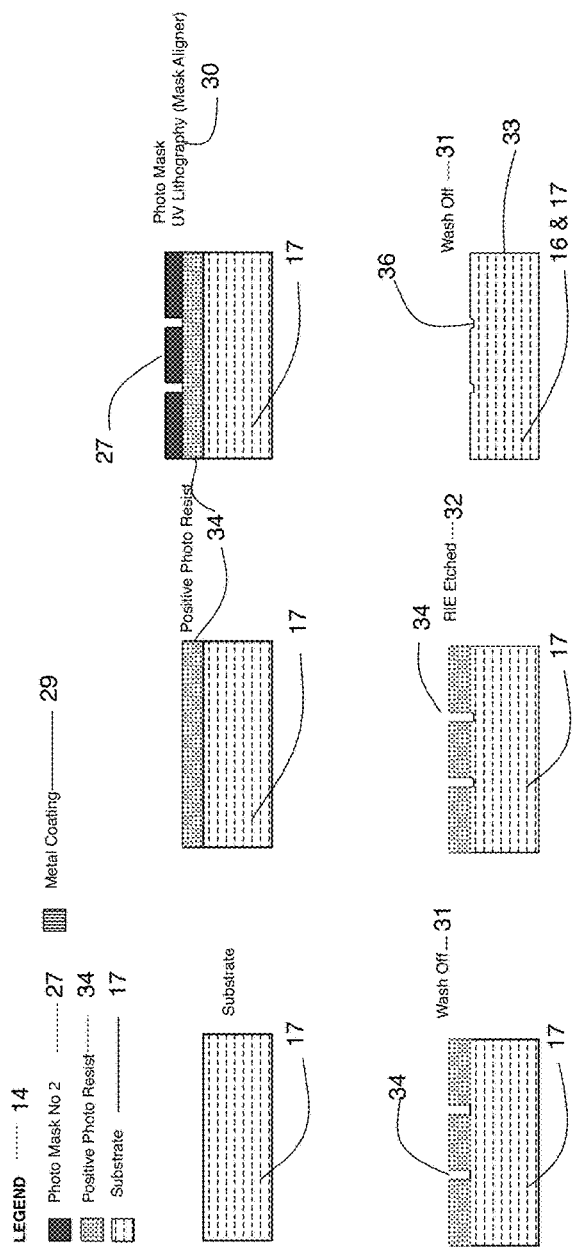
FIG. 17 shows one embodiment of creating the phase objects using a second photo-mask.

FIG. 17 is the second step of the three step process and fabricates phase objects 11 on device 6 which commences with a substrate 17, upon which a positive photo resist coating 34 is applied. A second photo mask 27 is used to expose the photo resist coating 34 in one embodiment to UV light using Ultra Violet Lithography (UVL) 30. The UV exposed negative photo resist 34 is washed off 31. The surface is then coated with metal 29, and then a 'lift-off' process 28 removes the remaining negative photo resist 25. The metal coated 29 substrate 17 is then etched 36 in one embodiment by a Reactive Ion Etcher (ME) 32, after which the negative photo resist is removed by wash-off 31, the remaining etched substrate 17 being the phase objects 11.

Figure 18:
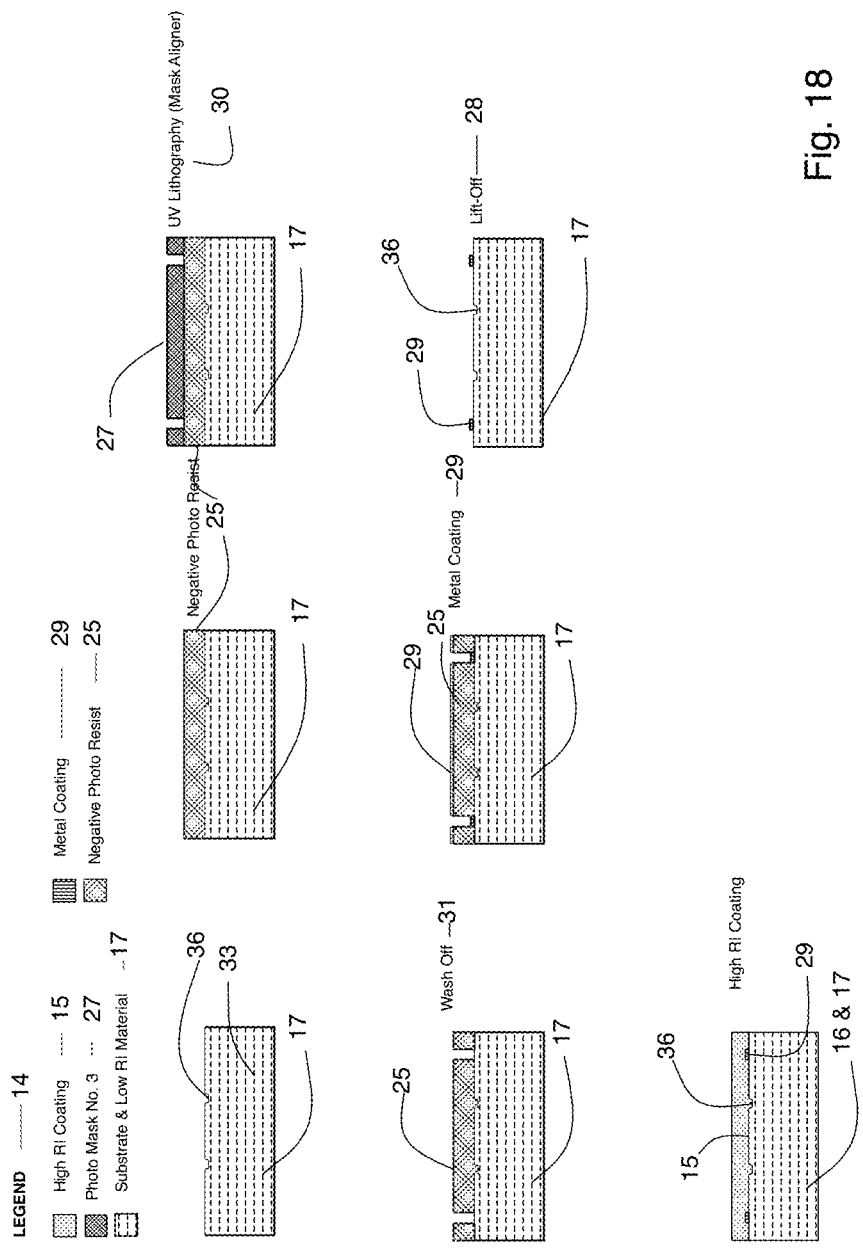
FIG. 18 shows one embodiment of creating guide lines and identifying features using a third photo-mask to assist users of the invention.

FIG. 18 is the third step of the three step process and shows one embodiment of creating guide lines and identifying features using a third photo-mask to guide assemblers of the invention. This commences with a substrate 17, already with etched phase objects 11, upon which a negative photo resist coating 25 is applied. A third photo mask 27 having the pattern of the guides is used together with Ultra Violet Lithography (UVL) 30 as one embodiment to expose the negative photo resist coating 25. The un-exposed negative photo resist 25 is washed off 31, then coated with metal 29, and then a lift-off process 28 to remove the remaining negative photo resist 25. The metal coated 29 and etched 36 substrate 17 is then coated with a high refractive index coating 15, thus resulting in a device 6 including the phase objects 11 and the guides 10, 12 and 13. The guides are formed from the metal coating 29.

EXAMPLES

Embodiments of the invention will now be exemplified with reference to the following non-limiting examples.

In one embodiment that uses PMMA A5 as the high RI material and quartz as the low RI material, the average RI difference is 0.0303 which results in the following OPL Differences and depth of etched substrate given various nominated phase angles (□) seen in Table 2 below, where n2 is the high RI material and n1 is the low RI material:

TABLE 2

| Set No. | n2 − n1 | OPL Diff (nm) | φ (°) | Thickness (nm) |
|---|---|---|---|---|
| 1 | 0.0303 | 10.3 | 7.4 | 340 |
| 2 | 0.0303 | 7.4 | 5.3 | 240 |
| 3 | 0.0303 | 6.1 | 4.4 | 200 |
| 4 | 0.0303 | 5.0 | 3.6 | 160 |
| 5 | 0.0303 | 4.2 | 3.0 | 140 |
| 6 | 0.0303 | 3.5 | 2.5 | 110 |
| 7 | 0.0303 | 2.4 | 1.7 | 80 |

In another embodiment that uses PMMA A30 as the high RI material and quartz as the low RI material, the average RI difference is 0.0279 which results in the following OPL Differences and thickness of material given various nominated phase angles seen in Table 3 below:

TABLE 3

| Set No. | n2 − n1 | OPL Diff (nm) | φ (°) | Thickness (nm) | Nominal Thickness (nm) |
|---|---|---|---|---|---|
| 1 | 0.0279 | 10.3 | 7.4 | 370 | 360 |
| 2 | 0.0279 | 7.4 | 5.3 | 260 | 250 |
| 3 | 0.0279 | 6.1 | 4.4 | 220 | 210 |
| 4 | 0.0279 | 5.0 | 3.6 | 180 | 170 |
| 5 | 0.0279 | 4.2 | 3.0 | 150 | 150 |
| 6 | 0.0279 | 3.5 | 2.5 | 120 | 120 |
| 7 |  | 2.4 | 1.7 | 80 | 80 |

In the above table, a sixth column 'Nominal Thickness' has been added which is an average of both types of PMMA, which has been chosen as a specification for phase objects of each set for one of the embodiments.

The 'Nominated Thickness' above should be approximately equivalent to each of the phase angles and OPL Differences as used for the HSE/NPL test slide, thus leading to a desired equivalence in performance of test slides of this invention and that of the HSE/NPL test slides. A departure of several tenths of a degree would be of little consequence to the detectability of the phase objects, but the above figures will be retained and repeated in the specification for convenience, taking into account the said departures referred to above.

Independent of the above stable materials and processes employed, every device can be compared with one or more 'masters' which may assist in guaranteeing stable performance from device to device and from batch to batch. This may reduce rejections of test slides as a result of failed inspections, and may help guarantee the uniformity of the tests slides being produced as a result.

It is to be understood that, if any prior art publication is referred to herein, such reference does not constitute an admission that the publication forms a part of the common general knowledge in the art, in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A phase contrast detection limit test slide for testing a phase contrast microscope, the test slide comprising a series of devices each having a first end and an opposing second end and comprising a plurality of phase objects formed by nanometre fabrication techniques and disposed substantially between the first and second ends, wherein the plurality of phase objects of any one device have a single phase angle in the range of about 2° to about 8°, and the devices are arranged over the test slide so that the phase angle increases across the series of devices, wherein each plurality of phase objects is further arranged substantially in the centre of concentric guides provided on each device to guide the eye to the phase objects, and a cover slip disposed over the devices.

2. The phase contrast detection limit test slide of claim 1, wherein the concentric guides are each adjacent at least one distinguishing mark which is unique to each device and is substantially similar in size to the concentric guides.

3. The phase contrast detection limit test slide of claim 2 wherein the at least one distinguishing mark is replicated wholly or in part in smaller size in the respective concentric guides to which it is adjacent.

4. The phase contrast detection limit test slide of claim 2, wherein a first distinguishing mark is located towards the first end of a device and a second distinguishing mark is located towards the second end of the device and wherein the first and second distinguishing marks are substantially identical.

5. The phase contrast detection limit test slide of claim 1, wherein there are at least three devices in the series of devices and the single phase angle of the phase objects of the devices is selected from the group 1.7, 2.5, 3.0, 3.6, 4.4, 5.3, 6.2 and 7.4 or within plus or minus 0.1 or 0.2 degrees of the said angle.

6. The phase contrast detection limit test slide of claim 5, wherein there are seven devices in the series of devices and the single phase angle of the phase objects of the seven devices is respectively 1.7, 2.5, 3.0, 3.6, 4.4, 5.3 and 7.4.

7. The phase contrast detection limit test slide of claim 5, wherein a first device has phase objects with a phase angle of 1.7 and a distinguishing mark comprising at least the letter A and wherein the fifth device has a has phase objects with a phase angle of 7.4 and a distinguishing mark comprising at least the letter E.

8. The phase contrast detection limit test slide of claim 1, wherein the phase objects are formed by variations in topography at the interface between a first material and a second material, the first and second materials having different refractive indices.

9. The phase contrast detection limit test slide of claim 8, wherein the average RI difference between the first and second materials having different refractive indices is in the range of from about 0.8% up to about 4.6%.

10. The phase contrast detection limit test slide of claim 9, wherein the first material is quartz and the second material is PMMA.

11. The phase contrast detection limit test slide of claim 1, wherein the phase objects are etched lines with a length in the range of from about 20 to about 360 nm, preferably 80 nm to about 140 nm.

12. The phase contrast detection limit test slide of claim 11, wherein the etched lines have a width in the range of from about 0.5 to 1.5 µm.

13. The phase contrast detection limit test slide of claim 1, wherein the nanofabrication technique includes nanolithography.

14. The phase contrast detection limit test slide of claim 1, wherein the test slide comprises a top slide portion and a bottom slide portion, wherein the top portion defines a cut-out and the bottom portion defines a smaller cut-out, the cut-outs arranged in each portion so that when the top and bottom portions are overlaid on one another light can pass through the cut-out part of the slide, wherein the cut-out in the top portion is larger than the cut-out in the bottom portion so that once overlaid, a recess is defined by the wall of the cut-out of the portion, into which recess the series of devices are able to fit snugly so as to be supported by their respective first and second ends by the exposed part of the bottom portion, and the devices are each supported so that in use light passes through the part of the devices comprising the plurality of phase objects.

15. The phase contrast detection limit test slide of claim 14, wherein the cut-out in the top portion is substantially rectangular and each of the devices are substantially rectangular.

* * * * *